(12) United States Patent
Zhang et al.

(10) Patent No.: US 9,967,592 B2
(45) Date of Patent: May 8, 2018

(54) BLOCK-BASED ADVANCED RESIDUAL PREDICTION FOR 3D VIDEO CODING

(71) Applicant: QUALCOMM Incorporated, San Diego, CA (US)

(72) Inventors: Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 14/592,633

(22) Filed: Jan. 8, 2015

(65) Prior Publication Data

US 2015/0201212 A1    Jul. 16, 2015

Related U.S. Application Data

(60) Provisional application No. 61/926,290, filed on Jan. 11, 2014.

(51) Int. Cl.
    *H04N 19/577* (2014.01)
    *H04N 19/52* (2014.01)
    *H04N 19/597* (2014.01)

(52) U.S. Cl.
    CPC ........... *H04N 19/577* (2014.11); *H04N 19/52* (2014.11); *H04N 19/597* (2014.11)

(58) Field of Classification Search
    CPC ..... H04N 19/577; H04N 19/52; H04N 19/597
    USPC .................................................... 375/240.16
    See application file for complete search history.

(56) References Cited

U.S. PATENT DOCUMENTS

| 7,978,920 B2 * | 7/2011 | Okazaki | H04N 19/51 |
| | | | 375/240 |
| 9,451,283 B2 * | 9/2016 | Kwon | H04N 19/33 |
| 9,648,342 B2 * | 5/2017 | Zhang | H04N 19/52 |
| 2012/0269269 A1 * | 10/2012 | Choi | H04N 19/597 |
| | | | 375/240.16 |

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

(Continued)

*Primary Examiner* — Mohammed Rahaman
*Assistant Examiner* — Jimmy S Lee
(74) *Attorney, Agent, or Firm* — Shumaker & Sieffert, P.A.

(57) ABSTRACT

Techniques for advanced residual prediction (ARP) in video coding may include receiving a first encoded block of video data in a first access unit, wherein the first encoded block of video data was encoded using advanced residual prediction and bi-directional prediction, determining temporal motion information for a first prediction direction of the first encoded block of video data, and identifying reference blocks for a second prediction direction, different than the first prediction direction, using the temporal motion information determined for the first prediction direction, wherein the reference blocks are in a second access unit.

14 Claims, 20 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011 (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 May 7, 2012 (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.
Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.
Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Liu et al., "CE2 related: Simplification of Advanced Residual Prediction," JCT-3V Meeting; Mar. 29-Apr. 4, 2014; Valencia. ES (the Joint Collaborative Team on 3D Video Coding Extension Development of ISO/IEC JTC1/SC29/WG11 and ITU-T SG.16 ); URL: http://phenix.int-evry.fr/jct2/, No. JCT3V-H0132, Mar. 21, 2014, XP030132208, 7 pp.
Sugimoto et al., "3D-CE4.h: Simplification of inter-view ARP," JCT-3V Meeting; Jan. 11-17, 2014; San Jose, CA, US (the Joint Collaborative Team on 3D Video Coding Extension Development of ISO/IEC JTC1/SC29/WG11 and ITU-T SG.16 ); URL: http://phenix.int-evry.fr/jct2/, No. JCT3V-G0158, Jan. 9, 2014, XP030131941, 5 pp.
Zhang et al., "CE4: Advanced residual prediction for multiview coding," JCT-3V Meeting; Apr. 20-26, 2013; Incheon, KR (the Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0177, XP030130841, Apr. 13, 2013, 10 pp.
Zhang et al., "CE4: Further improvements on advanced residual prediction," JCT-3V Meeting; Oct. 25-Nov. 1, 2013, Geneva, CH (the Joint Collaborative Team on 3D Video Coding Extension Development of ISO/IEC JTC1/SC29/WG11 and ITU-T SG.16 ), No. JCT3V-F0123, XP030131548, Oct. 18, 2013, 6 pp.
Zhang et al., "Test Model 6 of 3D-HEVC and MV-HEVC," JCT-3V Meeting; Oct. 25-Nov. 1, 2013; Geneva, CH (the Joint Collaborative Team on 3D Video Coding Extension Development of ISO/IEC JTC1/SC29/WG11 and ITU-T SG.16); URL: http://phenix.int-evry.fr/jct2/, No. JCT3V-F1005, Dec. 16, 2013, XP030131735, 52 pp.
An et al., "3D-CE3: Sub-PU level inter-view motion prediction," JCT-3V Meeting; Oct. 25-Nov. 1, 2013; Geneva, CH (the Joint Collaborative Team on 3D Video Coding Extension Development of ISO/IEC JTC1/SC29/WG11 and ITU-T SG.16); No. JCTVC-F0110, Mar. 27, 2013; 4 pp.
Zhang et al., "CE4: Further improvements on advanced residual prediction," JCT-3V Meeting; Oct. 25-Nov. 1, 2013; Geneva, CH (the Joint Collaborative Team on 3D Video Coding Extension Development of ISO/IEC JTC1/SC29/WG11 and ITU-T SG.16); No. JCT3V-F0123, Oct. 18, 2013; 6 pp.
Tech et al., "3D-HEVC Draft Text 2," JCT-3V Meeting; Oct. 25-Nov. 1, 2013; Geneva, CH; (the Joint Collaborative Team on 3D Video Coding Extension Development of ISO/IEC JTC1/SC29/WG11 and ITU-T SG.16); No. JCT3V-F1001_v4, Dec. 14, 2013; 94 pp.
Zhang et al., "CE5.h: Disparity vector generation results," JCT2-A0097, JCT-3V Meeting; MPEG Meeting; Jul. 16-20, 2012; Stockholm, SE (the Joint Collaborative Team on 3D Video Coding Extension Development of ISO/IEC JTC1/SC29/WG11 and ITU-T SG.16); URL: http://phenix.int-evry.fr/jct2/, XP030130096, Jul. 10, 2012; 5 pp.
Sung et al., "3D-CE5.h: Simplification of disparity vector derivation for HEVC-based 3D video coding," JCT-3V Meeting; MPEG Meeting; Jul. 16-20, 2012; Stockholm, SE (the Joint Collaborative Team on 3D Video Coding Extension Development of ISO/IECJTC1/SC29/WG11 and ITU-T SG.16); URL: http://phenix.int-evry.fr/jct2/, No. JCT2-A0126, Jul. 14, 2012, 4 pp., XP030130125.
Kang et al., "3D-CE5.h related: Improvements for disparity vector derivation," JCT-3V Meeting; Mpeg Meeting; Oct. 13-19, 2012; Shanghai, CH (the Joint Collaborative Team on 3D Video Coding Extension Development of ISO/IEC JTC1/SC29/WG11 and ITU-T SG.16); URL: http://phenix.int-evry.fir/jct2/, No. JCT3V-B0047, Oct. 10, 2012, 4 pp., XP030130228.
Kang et al., "CE2.h related: CU-based Disparity Vector Derivation in 3D-HEVC," Qualcomm Incorporated, Apr. 20-26, 2013; JCT3V-D0181, Joint Collaborative Team on 3D Video Coding Extensions of ITU-T SG 16 WP 3 and ISO/IEC JTC 1/SC 29/WG 11, 4th Meeting: Incheon, KR, Jul. 29, 2013, 4 pp.
Zhang et al., "3D-CE4: Advanced residual prediction for multiview coding," JCT-3V Meeting, MPEG Meeting, Jan. 17-23, 2013; Geneva, CH (the Joint Collaborative Team on 3D Video Coding Extension Development of ISO/IEC JTC1/SC29/WG11 and ITU-T SG.16 ), URL: http://phenix.int-evry.fr/jct2/, No. JCT3V-00049, Jan. 10, 2013, XP030130465, 6 pp.
Bross et al., "Editors' proposed corrections to HEVC version 1," JCT-3V Meeting, MPEG Meeting, Apr. 18-26, 2013; Incheon, KR (the Joint Collaborative Team on 3D Video Coding Extension Development of ISO/IEC JTC1/SC29/WG11 and ITU-T SG.16 ), No. JCTVC-M0432_v3, Apr. 25, 2013; 310 pp.
Tech et al., "3D-HEVC Draft 5," JCT-3V Meeting, MPEG Meeting, Jul. 3-9, 2014; Sapporo, JP (the Joint Collaborative Team on 3D Video Coding Extension Development of ISO/IEC JTC1/SC29/WG11 and ITU-T SG.16 ); No. JCT3V-I1001_v3, Aug. 13, 2014, 94 pp.
International Search Report from International Application No. PCT/US2015/010878, dated Apr. 1, 2015, 13 pp.
Response to Written Opinion dated Apr. 1, 2015, from International Application No. PCT/US2015/010878, filed on Nov. 10, 2015, 5 pp.
Second Written Opinion from International Application No. PCT/US2015/010878, dated Feb. 9, 2016, 5 pp.

(56) References Cited

OTHER PUBLICATIONS

Response to Second Written Opinion dated Feb. 9, 2016, from International Application No. PCT/US2015/010878, filed on Mar. 24, 2016, 7 pp.
International Preliminary Examination on Patentability of International Application No. PCT/US2015/010878, dated Apr. 22, 2016, 21 pp.

\* cited by examiner

BLOCK-BASED ADVANCED RESIDUAL PREDICTION FOR 3D VIDEO CODING

This application claims the benefit of U.S. Provisional Application No. 61/926,290, filed Jan. 11, 2014, the entire content of which is hereby incorporated by reference in its entirety.

TECHNICAL FIELD

This disclosure is related to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure is related to multiview video coding, in which the coded video data includes two or more views. In particular, this disclosure describes various techniques related to advanced residual prediction (ARP). The techniques of this disclosure may reduce the number of times a video coder (e.g., video encoder and/or video decoder) accesses motion information in order to perform ARP, or any underlying motion compensation processes (i.e., using assigned motion vectors to generate the prediction blocks with potential interpolation operations). In this way, the speed of video coding (i.e., encoding or decoding) may be increased since fewer memory accesses for motion information are performed.

In one example of the disclosure, a method for decoding video data comprises receiving a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction, determining temporal motion information for the first prediction direction for the first encoded block of video data, determining disparity motion information for the second prediction direction for the first encoded block of video data, identifying reference blocks for the second prediction direction, different than the first prediction direction, using the determined temporal motion information for the first prediction direction, wherein the reference blocks are in an access unit different than the first access unit, and performing advanced residual prediction on the first encoded block of video data using the identified reference blocks for the second prediction direction.

In another example of the disclosure, an apparatus configured to decode video data comprises a video data memory configured to store a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction, and one or more processors in communication with the video data memory and configured to determine temporal motion information for the first prediction direction for the first encoded block of video data, determine disparity motion information for the second prediction direction for the first encoded block of video data, identify reference blocks for the second prediction direction, different than the first prediction direction, using the determined temporal motion information for the first prediction direction, wherein the reference blocks are in an access unit different than the first access unit, and perform advanced residual prediction on the first encoded block of video data using the identified reference blocks for the second prediction direction.

In another example of the disclosure, an apparatus configured to decode video data comprises means for receiving a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction, means for determining temporal motion information for the first prediction direction for the first encoded block of video data, means for determining disparity motion information for the second prediction direction for the first encoded block of video data, means for identifying reference blocks for the second prediction direction, different than the first prediction direction, using the determined temporal motion information for the first prediction direction, wherein the reference blocks are in an access unit different than the first access unit, and means for performing advanced residual prediction on the first encoded block of video data using the identified reference blocks for the second prediction direction.

In another example, this disclosure describes a computer-readable storage medium storing instructions that, when executed, cause one or more processors of a device configured to decode video data to receive a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction, determine temporal motion information for the first prediction direction for the first encoded block of video data, determine disparity motion information for the second prediction direction for the first encoded block of video data, identify reference blocks for the first prediction direction using the determined temporal motion information, identify reference blocks for the second prediction direction, different than the first prediction direction, using the determined temporal motion information for the first prediction direction, wherein the reference blocks are in an access unit different than the first access unit, and perform advanced residual prediction on the first encoded block of video data using the identified reference blocks for the second prediction direction.

The details of one or more examples of the disclosure are set forth in the accompanying drawings and the description below. Other features, objects, and advantages will be apparent from the description, drawings, and claims.

DETAILED DESCRIPTION

In general, this disclosure is related to multiview video coding, in which the coded video data includes two or more views. In some examples, the multiview video coding includes a multiview-plus-depth video coding process. In some examples, the multiview coding may include coding of three-dimensional (3D) video, and may be referred to as 3D video coding. In various examples of this disclosure, techniques for advanced residual prediction (APR) in a non-base view of a multi-view and/or 3D video coding sequences are described. The techniques of this disclosure may reduce the number of times a video coder (e.g., video encoder and/or video decoder) accesses motion information, e.g., from memory, in order to perform ARP, or any underlying inter-prediction (e.g., temporal and/or inter-view inter-prediction and bi-prediction). In this way, the speed of video coding (i.e., encoding or decoding) may be increased since fewer memory accesses for motion information are performed.

For example, this disclosure describes a method for decoding video data comprises receiving a first encoded block of video data in a first access unit, wherein the first encoded block of video data was encoded using advanced residual prediction and bi-directional inter-view prediction, determining temporal motion information for a first prediction direction for the first encoded block of video data, and identifying reference blocks for a second prediction direction, different than the first prediction direction, using the temporal motion information determined for the first prediction direction, wherein the reference blocks are in a second access unit.

Figure 1:
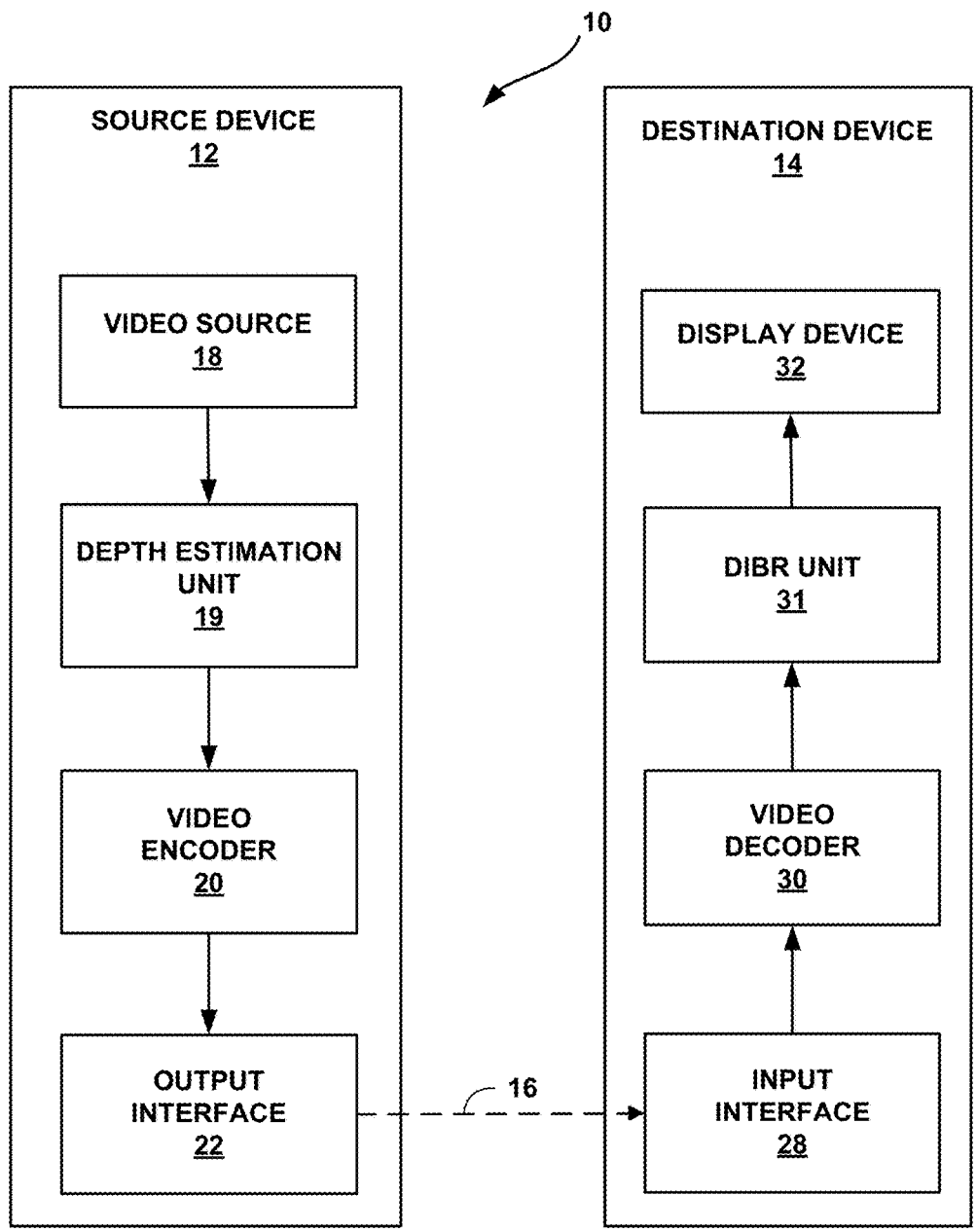
FIG. 1 is a block diagram illustrating an example video encoding and decoding system that may utilize the techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 may provide video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide one or more views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. In accordance with the techniques of this disclosure, video decoder 30 may provide original and updated precision values for depth ranges and camera parameters to DIBR unit 31, which may use the depth ranges and camera parameters to properly synthesize views.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

In one example of the disclosure, video decoder 30 may be configured to receive a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction. Video decoder 30 may be further configured to determine temporal motion information for the first prediction direction for the first encoded block of video data and determine disparity motion information for the second prediction direction for the first encoded block of video data. Video decoder 30 may be further configured to identify reference blocks for the second prediction direction, different than the first prediction direction, using the determined temporal motion information for the first prediction direction, wherein the reference blocks are in an access unit different than the first access unit, and perform advanced residual prediction on the first encoded block of video data using the identified reference blocks for the second prediction direction. In this way, temporal motion information for the first prediction direction is reused for the second prediction direction. As such, fewer memory accesses of temporal motion information need to be made since the temporal motion information of the block identified by the motion vector of the first encoded block corresponding to the second prediction direction does not need to be accessed, thus allowing for quicker video decoding. In addition, the total number of reference blocks used when performing ARP may be reduced from 6 to 5, which results in less computational complexity in terms of interpolation using multiplication and addition operations. Likewise, when performing bi-directional inter-prediction, video encoder 20 may be configured to reuse temporal motion information for a first prediction direction when encoding the second prediction direction.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, such as the MVC extension of ITU-T H.264/AVC. The latest joint draft of MVC is described in "Advanced video coding for generic audiovisual services," ITU-T Recommendation H.264, March 2010. In particular, video encoder 20 and video decoder 30 may operate according to 3D and/or multi-view coding standard, including a 3D extension of the HEVC standard (e.g., 3D-HEVC).

One draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 January, 2013, which, as of Jan. 5, 2015, is downloadable from: http://phenix.int-evry.fr/jct/doc_end_user/documents/12_Geneva/wg11/JCTVC-L1003-v34.zip.

Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of Jan. 5, 2015, is available from: http://phenix.int-evry.fr/jct/doc_end_user/documents/13_Incheon/wg11/JCTVC-M0432-v3.zip. A multiview extension to HEVC, namely MV-HEVC, is also being developed by the JCT-3V.

Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it should be guaranteed that there are only high-level syntax (HLS) changes in it, such that no module in the coding unit/prediction unit level in HEVC needs to be re-designed and can be fully reused for MV-HEVC. For 3D-HEVC, new coding tools, including those in coding unit/prediction unit level, for both texture and depth views may be included and supported.

One version of the reference software 3D-HTM for 3D-HEVC can be downloaded from the following link. [3D-HTM version 9.0r1]: https://hevc.hhi.fraunhofer.de/svn/svn_3DVCSoftware/tags/HTM-9.0r1/. One version of the reference software description is described in Li Zhang, Gerhard Tech, Krzysztof Wegner, Sehoon Yea, "Test Model 6 of 3D-HEVC and MV-HEVC," JCT3V-F1005, Joint Collaborative Team on 3D Video Coding Extension Development of ITU-T SG 16 WP 3 and ISO/IEC JTC 1/SC 29/WG 11, 6th Meeting: Geneva, CH, November 2013 (JCT3V-F1005). JCT3V-F1005 may be downloaded from http://phenix.it-sudparis.eu/jct2/doc_end_user/current_document.php?id=1636.

One working draft of 3D-HEVC is described in Gerhard Tech, Krzysztof Wegner, Ying Chen, Sehoon Yea, "3D-HEVC Draft Text 2," JCT3V-F1001, Joint Collaborative Team on 3D Video Coding Extension Development of ITU-T SG 16 WP 3 and ISO/IEC JTC 1/SC 29/WG 11, 6th Meeting: Geneva, CH, November 2013 (JCT3V-F1-001). JCT3V-F1001 is available from: http://phenix.it-sudparis.eu/jct2/doc_end_user/current_document.php?id=1361. The latest software description (document number: E1005) is be available from: http://phenix.it-sudparis.eu/jct2/doc_end_user/current_document.php?id=1360.

A more recent version of the software 3D-HTM for 3D-HEVC can be downloaded from the following link: [3D-HTM version 12.0]: https://hevc.hhi.fraunhofer.de/svn/svn_3DVCSoftware/tags/HTM-12.0/. The corresponding working draft of 3D-HEVC (document number: 11001) is available from: http://phenix.int-evey.fr/jct3v/doc_end_user/current_document.php?id=2299. The latest software description (document number: 11005) is be available from: http://phenix.int-evry.fr/jct3v/doc_end_user/current_document.php?id=2301.

Initially, example coding techniques of HEVC will be discussed. The HEVC standardization efforts were based on an evolving model of a video coding device referred to as the HEVC Test Model (HM). The HM presumed several additional capabilities of video coding devices relative to existing devices according to, e.g., ITU-T H.264/AVC. For example, whereas H.264 provides nine intra-prediction encoding modes, the HM may provide as many as thirty-three angular intra-prediction encoding modes, plus DC and Planar modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In some versions of HEVC, for the luma component of each PU, an intra prediction method is utilized with 33 angular prediction modes (indexed from 2 to 34), DC mode (indexed with 1) and Planar mode (indexed with 0).

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction or uni-predictive prediction) or bi-directional inter prediction (i.e., bi-prediction or bi-predictive prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

Typically a reference picture list construction for the first or the second reference picture list (e.g., RefPicList0 or RefPicList1) of a B picture includes two steps: reference picture list initialization and reference picture list reordering (modification). The reference picture list initialization is an explicit mechanism that puts the reference pictures in the reference picture memory (also known as decoded picture buffer) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification) may be put in a very further position in the list. However, if a position of a picture exceeds the number of active reference pictures of the list, the picture is not considered as an entry of the final reference picture list. The number of active reference pictures may be signaled in the slice header for each list.

After reference picture lists are constructed (namely RefPicList0 and RefPicList1, if available), a reference index to a reference picture list can be used to identify any reference picture included in the reference picture list.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge mode or advanced motion vector prediction (AMVP) mode. In other words, in HEVC, there are two modes for the prediction of motion parameters, one being the merge mode and the other being AMVP. Motion prediction may comprise the determination of motion information of a video unit (e.g., a PU) based on motion information of one or more other video units. The motion information of a PU may include motion vector(s) of the PU and reference index(es) of the PU.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks. In some examples the candidates may also include an artificially generated candidate.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a predictive block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX motion information of a current PU using AMVP mode, video encoder 20 may signal a RefPicListX motion vector difference (MVD) for the current PU and a RefPicListX reference index for the current PU in addition to signaling a RefPicListX MVP flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX motion vector predictor (MVP) flag, a RefPicListX reference index value, and a RefPicListX MVD. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When video decoder 30 generates an AMVP candidate list for a current PU, video decoder 30 may derive one or more AMVP candidates based on the motion information of PUs (i.e., spatially-neighboring PUs) that cover locations that spatially neighbor the current PU. A PU may cover a location when a prediction block of the PU includes the location.

A candidate in a merge candidate list or an AMVP candidate list that is based on the motion information of a PU that temporally neighbors a current PU (i.e., a PU that is in a different time instance than the current PU) may be referred to as a TMVP. That is, a TMVP may be used to improve the coding efficiency of HEVC and, different from other coding tools, TMVP may need to access the motion vector of a frame in a decoded picture buffer, more specifically in a reference picture list.

The use of TMVPs may be enabled or disabled on a CVS-by-CVS (coded video sequence) basis, a slice-by-slice basis, or on another basis. A syntax element (e.g., sps_temporal_mvp_enable_flag) in a SPS may indicate whether the use of TMVPs is enabled for a CVS. Furthermore, when the use of TMVPs is enabled for a CVS, the use of TMVPs may be enabled or disabled for particular slices within the CVS. For instance, a syntax element (e.g., slice temporal_mvp_enable_flag) in a slice header may indicate whether the use of TMVPs is enabled for a slice. Thus, in an inter predicted slice, when the TMVP is enabled for a whole CVS (e.g., sps_temporal_mvp_enable_flag in a SPS is set to 1), slice temporal_mvp_enable_flag is signaled in the slice header to indicate whether TMVP is enabled for the current slice.

To determine a TMVP, a video coder may firstly identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated-_from_l0 flag) in a slice header to indicate whether the co-located picture is in RefPicList0 or RefPicList1. In other words, to get a TMVP, firstly a co-located picture is to be identified. If the current picture is a B slice, a collocated-_from_l0 flag is signaled in slice header to indicate whether the co-located picture is from RefPicList0 or RefPicList1.

After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list. That is, after a reference picture list is identified, collocated_ref_idx, signaled in a slice header is used to identify the picture in the reference picture list.

The video coder may identify a co-located PU by checking the co-located picture. The TMVP may indicate either the motion information of a right-bottom PU of the CU containing the co-located PU, or the motion information of the right-bottom PU within the center PUs of the CU containing this PU. Thus, either the motion of the right-bottom PU of the CU containing this PU, or the motion of the right-bottom PU within the center PUs of the CU containing this PU is used. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process (i.e., motion vectors of a TMVP) are used to generate a motion candidate for merge mode or AMVP mode, the video coder may scale the motion vectors based on the temporal location (reflected by POC value). For instance, a video coder may increase the magnitude of a motion vector by greater amounts when a difference between the POC values of a current picture and a reference picture is greater and increase the magnitude of the motion vector by lesser amounts when a difference between the POC values of the current picture and the reference picture is less.

The target reference index of all possible reference picture lists for the temporal merging candidate derived from a TMVP may be always set to 0. However, for AMVP, the target reference index of all possible reference pictures is set equal to the decoded reference index. In other words, the target reference index of all possible reference picture lists for the temporal merging candidate derived from TMVP is always set to 0 while for AMVP, it is set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

In some examples, video encoder 20 and video decoder 30 (FIG. 1) may employ techniques for multiview and/or 3D video coding, e.g., coding of video data including two or more views. In such examples, video encoder 20 may encode a bitstream that includes encoded video data for two or more views, and video decoder 30 may decode the encoded video data to provide the two or more views, e.g., to display device 32. In some examples, video decoder 30 may provide the multiple views of video data to enable display device 32 to display 3D video. In some examples, video encoder 20 and video decoder 30 may conform to a 3D-HEVC extension of the HEVC standard, e.g., in which multiview coding or multiview plus depth coding processes are used. Multiview and/or 3D video coding may involve coding of two or more texture views and/or views including texture and depth components. In some examples, the video data encoded by video encoder 20 and decoded by video decoder 30 includes two or more pictures at any given time instance, i.e., within an "access unit," or data from which two or more pictures at any given time instance can be derived.

In some examples, a device, e.g., video source 18, may generate the two or more pictures by, for example, using two or more spatially offset cameras, or other video capture devices, to capture a common scene. Two pictures of the same scene captured simultaneously, or nearly simultaneously, from slightly different horizontal positions can be used to produce a three-dimensional effect. In some examples, video source 18 (or another component of source device 12) may use depth information or disparity information to generate a second (or other additional) picture of a second (or other additional) view at a given time instance from a first picture of a first view at the given time instance. In this case, a view within an access unit may include a texture component corresponding to a first view and a depth component that can be used, with the texture component, to generate a second view. The depth or disparity information may be determined by a video capture device capturing the first view, e.g., based on camera parameters or other information known regarding the configuration of the video capture device and the capturing of the video data for the first view. The depth or disparity information may additionally or alternatively be calculated, e.g., by video source 18 or another component of source device 12, from camera parameters and/or video data in the first view.

To present 3D video, display device 32 may simultaneously, or nearly simultaneously, display two pictures associated with different views of a common scene, which were captured simultaneously or nearly simultaneously. In some examples, a user of destination device 14 may wear active glasses to rapidly and alternatively shutter left and right lenses, and display device 32 may rapidly switch between a left view and a right view in synchronization with the active glasses. In other examples, display device 32 may display the two views simultaneously, and the user may wear passive glasses, e.g., with polarized lenses, which filter the views to cause the proper views to pass through to the user's eyes. In other examples, display device 32 may comprise an autostereoscopic display, which does not require glasses for the user to perceive the 3D effect.

Multiview video coding refers to the manner in which a plurality of views is coded. In the case of 3D video coding, the plurality of views may, for example, correspond to a left-eye view and a right-eye view. Each view of the plurality of views includes a plurality of pictures. The viewer's perception of a 3D scene is due to the horizontal disparity between objects in the pictures of the different views.

A disparity vector (DV) for a current block of a current picture is a vector that points to a corresponding block in a corresponding picture that is in a different view than the current picture. Thus, using a DV, a video coder can locate, in a corresponding picture, the block of that corresponds to a current block of a current picture. In this case, the corresponding picture is a picture that is of the same temporal instance as the current picture but is in a different view. The corresponding block in the corresponding picture and the current block in the current picture may include similar video content; however, there is at least a horizontal disparity between the location of the current block in the current picture and the location of the corresponding block in the corresponding picture. The DV of the current block provides a measure of this horizontal disparity between the block in the corresponding picture and the current block in the current picture.

In some instances, there may also be vertical disparity between the location of the block within the corresponding picture and the location of the current block within the current picture. The DV of the current block may also provide a measure of this vertical disparity between the block in the corresponding picture and the current block in the current picture. A DV contains two components (an x-component and a y-component); although in many instances the vertical component will be equal to zero. The time when the current picture of the current view and the corresponding picture of the different view are displayed may be the same, which is to say the current picture and the corresponding pictures are pictures of the same temporal instance.

In video coding, there are generally two types of prediction, commonly referred to as intra-prediction and inter prediction. In intra-prediction, a video coder predicts a block of video in a picture based on an already-coded block in the same picture. In inter prediction, a video coder predicts a block of video in a picture based on an already-coded block of a different picture (i.e. a reference picture). A reference picture, as used in this disclosure, generally refers to any picture that contains samples that may be used for inter prediction in the decoding process of subsequent pictures in decoding order. When coding multiview content, e.g., according to 3D-HEVC, relative to a current picture, reference pictures may be either of the same temporal instance but in a different view or may be in the same view but of a different temporal instance. In the case of multiview coding, e.g., in 3D-HEVC, inter-picture prediction may include prediction of the current video block, e.g., current coding node of a CU, from another video block in a temporally-different picture, i.e., from a different access unit as the current picture, as well as prediction from a different picture in the same access unit as the current picture, but associated with a different view than the current picture.

In the latter case of the inter prediction, it can be referred to as inter-view coding or inter-view prediction. The reference picture which is in the same access unit as the current picture, but associated with a different view than the current picture, may be referred to as an inter-view reference picture. In multiview coding, inter-view prediction is performed among pictures captured in the different views of the same access unit (i.e., with the same time instance) to remove correlation between views. When coding a picture of a non-base view, e.g., a dependent view, a picture from the same access unit but a different view, e.g., from a reference view, such as the base view, may be added into a reference picture list. An inter-view reference picture can be put into any position of a reference picture list, as is the case with any inter prediction (e.g., temporal or inter-view) reference picture.

The block of the reference picture used for predicting the block of the current picture is identified by a motion vector. In multiview coding, there are at least two kinds of motion vectors. A temporal motion vector (TMV) is a motion vector pointing to a block in a temporal reference picture that is in the same view as the block being coded (e.g., the first example of inter prediction as described above), but a different time instance or access unit than the block being coded, and the corresponding inter prediction is referred to as motion-compensated prediction (MCP). Another type of motion vector is a disparity motion vector (DMV), which points to a block in a picture in the same access unit current picture, but of a different view. With a DMV, the corresponding inter prediction is referred to as disparity-compensated prediction (DCP) or inter-view prediction.

In the next section, multiview (e.g., as in H.264/MVC) and multiview plus depth (e.g., as in 3D-HEVC) coding techniques will be discussed. Initially, MVC techniques will be discussed. As noted above, MVC is a multiview coding extension of ITU-T H.264/AVC. In MVC, data for a plurality of views is coded in time-first order, and accordingly, the decoding order arrangement is referred to as time-first coding. In particular, view components (i.e., pictures) for each of the plurality of views at a common time instance may be coded, then another set of view components for a different time instance may be coded, and so on. An access unit may include coded pictures of all of the views for one output time instance. It should be understood that the decoding order of access units is not necessarily identical to the output (or display) order.

Figure 2:
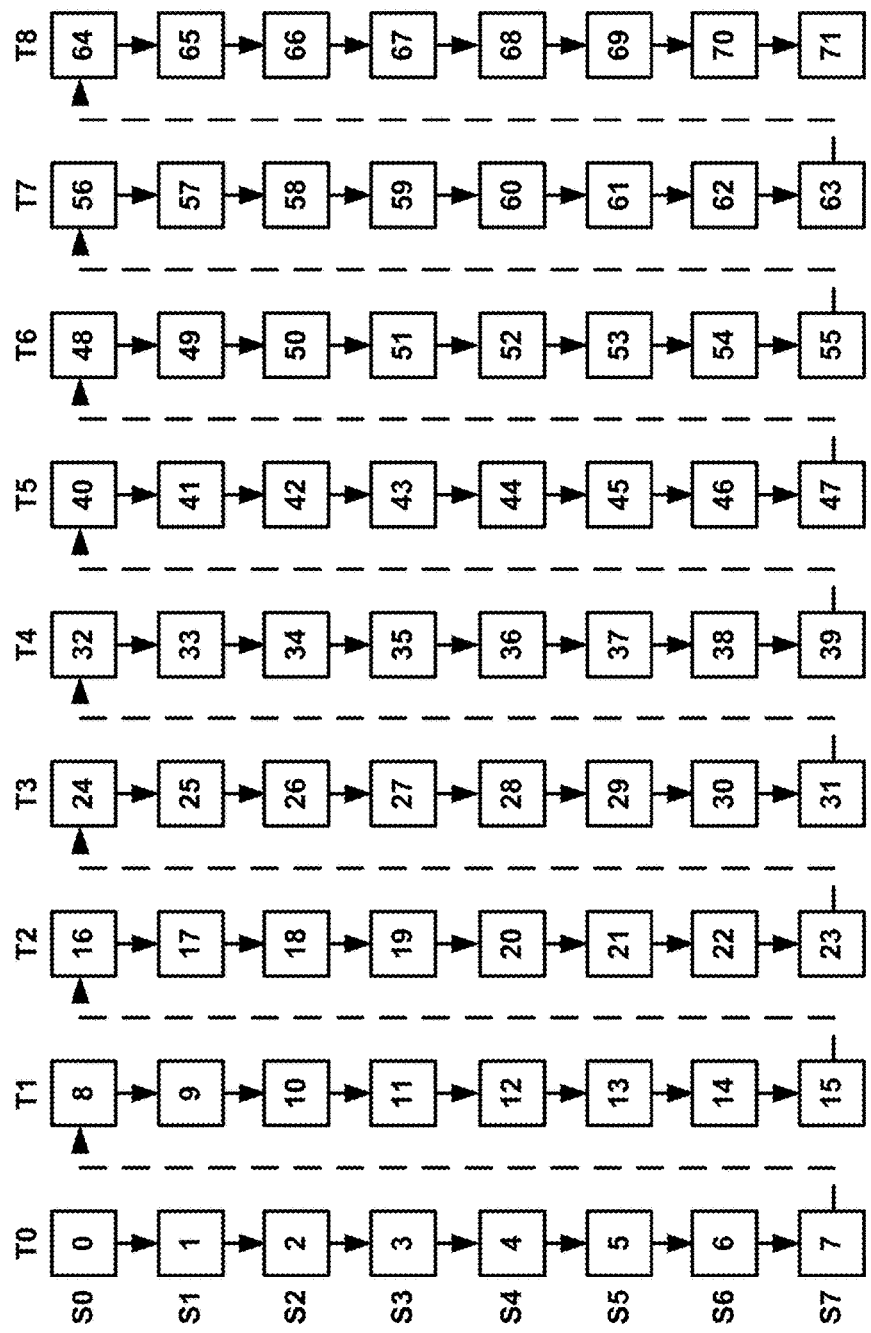
FIG. 2 is a graphical diagram illustrating an example multiview encoding or decoding order.

A typical MVC decoding order (i.e., bitstream order) is shown in FIG. 2. The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:
view component: A coded representation of a view in a single access unit. When a view includes both coded texture and depth representations, a view component consists of a texture view component and a depth view component.
texture view component: A coded representation of the texture of a view in a single access unit.
depth view component: A coded representation of the depth of a view in a single access unit.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. For 3D video coding, e.g., 3D-HEVC, each picture may include two component pictures: one component picture is referred to as a texture view component, and the other component picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
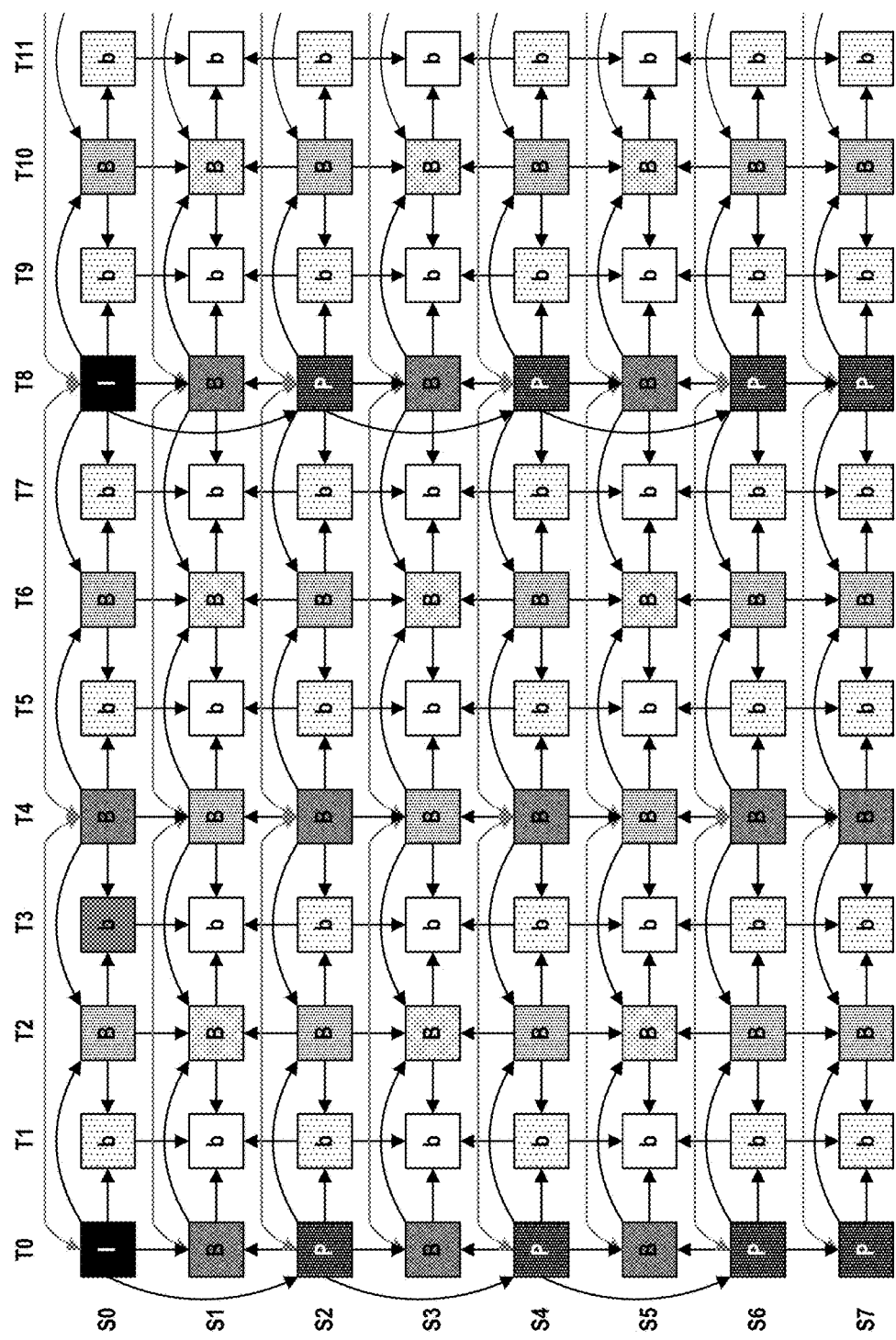
FIG. 3 is a conceptual diagram illustrating an example temporal and inter-view prediction pattern for multiview video coding.

A typical MVC prediction structure (including both inter-picture prediction within each view and inter-view prediction) for multi-view video coding is shown in FIG. 3. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of a proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views could also be supported in MVC. One of the advantages of MVC is that an MVC encoder could take more than two views as a 3D video input and an MVC decoder can decode such a multiview representation. As such, any renderer with an MVC decoder may expect 3D video contents with more than two views.

In MVC, inter-view prediction is allowed among pictures in the same access unit (i.e., with the same time instance). When coding a picture in one of the non-base views, a picture may be added into a reference picture list if it is in a different view, but within the same time instance. An inter-view reference picture can be put in any position of a reference picture list, just like any inter prediction reference picture. As shown in FIG. 3, a view component can use the view components in other views for reference. In MVC, inter-view prediction is realized as if the view component in another view was an inter-prediction reference.

In the context of multiview video coding, in general, there are two kinds of motion vectors. One is referred to as a normal motion vector. The normal motion vector points to temporal reference pictures and the corresponding temporal inter prediction is motion-compensated prediction (MCP). The other motion vector is a disparity motion vector (DMV). The DMV points to pictures in a different view (i.e., inter-view reference pictures) and the corresponding inter prediction is disparity-compensated prediction (DCP).

Figure 4:
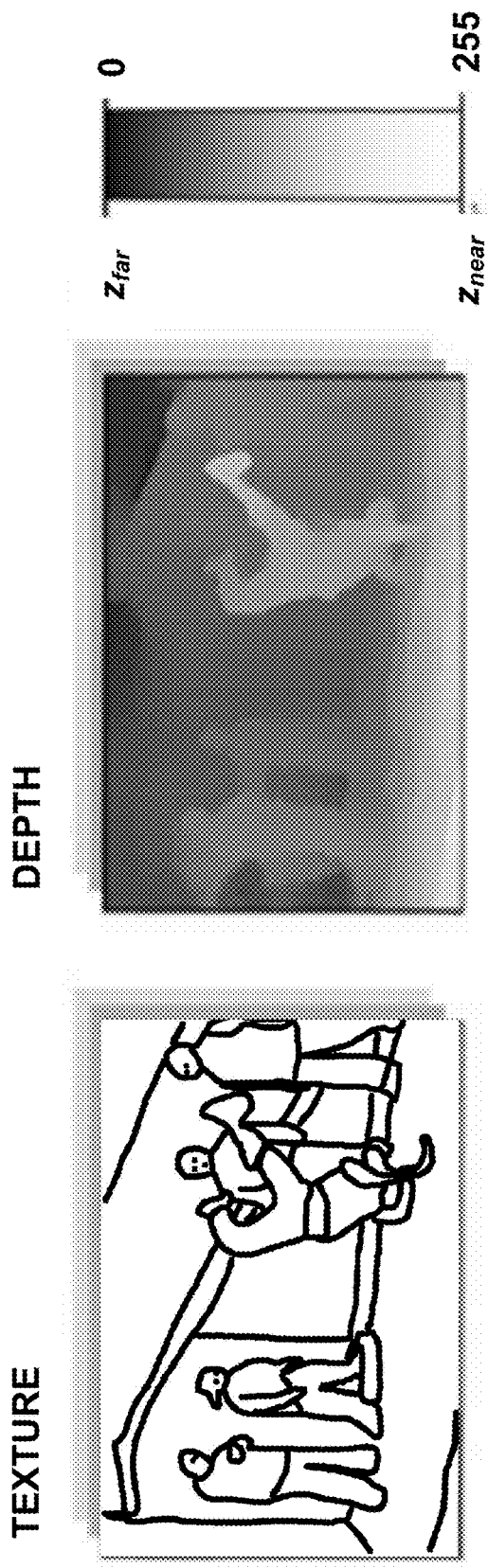
FIG. 4 is a conceptual diagram illustrating texture and depth values for 3D video.

Another type of multiview video coding format introduces the use of depth values (e.g., as in 3D-HEVC). For the multiview-video-plus-depth (MVD) data format, which is popular for 3D television and free viewpoint videos, texture images and depth maps can be coded with multiview texture pictures independently. FIG. 4 illustrates the MVD data format with a texture image and its associated per-sample depth map. The depth range may be restricted to be in the range of minimum znear and maximum zfar distance from the camera for the corresponding 3D points.

In HEVC, techniques for motion vector prediction may include a merge mode, skip mode, and an advance motion vector prediction (AMVP) mode. In general, according to merge mode and/or skip mode, a current video block (e.g., a PU) inherits the motion information, e.g., motion vector, prediction direction, and reference picture index, from another, previously-coded neighboring block, e.g., a spatially-neighboring block in the same picture, or a block in a temporal or interview reference picture. When implementing the merge/skip mode, video encoder 20 constructs a list of merging candidates that are the motion information of the reference blocks in a defined matter, selects one of the merging candidates, and signals a candidate list index identifying the selected merging candidate to video decoder 30 in the bitstream.

Video decoder 30, in implementing the merge/skip mode, reconstructs the merging candidate list according to the defined manner, and selects the one of the merging candidates in the candidate list indicated by the index. Video decoder 30 may then use the selected one of the merging candidates as a motion vector for the current PU at the same resolution as the motion vector of the selected one of the merging candidates, and pointing to the same reference picture as the motion vector for the selected one of the merging candidates. Merge mode and skip mode promote bitstream efficiency by allowing the video encoder 20 to signal an index into the merging candidate list, rather than all of the motion information for inter-prediction of the current video block.

When implementing AMVP, video encoder 20 constructs a list of candidate motion vector predictors (MVPs) in a defined matter, selects one of the candidate MVPs, and signals a candidate list index identifying the selected MVP to video decoder 30 in the bitstream. Similar to merge mode, when implementing AMVP, video decoder 30 reconstructs the list of candidate MVPs in the defined matter, and selects one of the MVPs based on candidate list index.

However, contrary to the merge/skip mode, when implementing AMVP, video encoder 20 also signals a reference picture index and prediction direction, thus specifying the reference picture to which the MVP specified by the candidate list index points. Further, video encoder 20 determines a motion vector difference (MVD) for the current block, where the MVD is a difference between the MVP and the actual motion vector that would otherwise be used for the current block. For AMVP, in addition to the reference picture index, reference picture direction and candidate list index, video encoder 20 signals the MVD for the current block in the bitstream. Due to the signaling of the reference picture index and prediction vector difference for a given block, AMVP may not be as efficient as merge/skip mode, but may provide improved fidelity of the coded video data.

Figure 5:
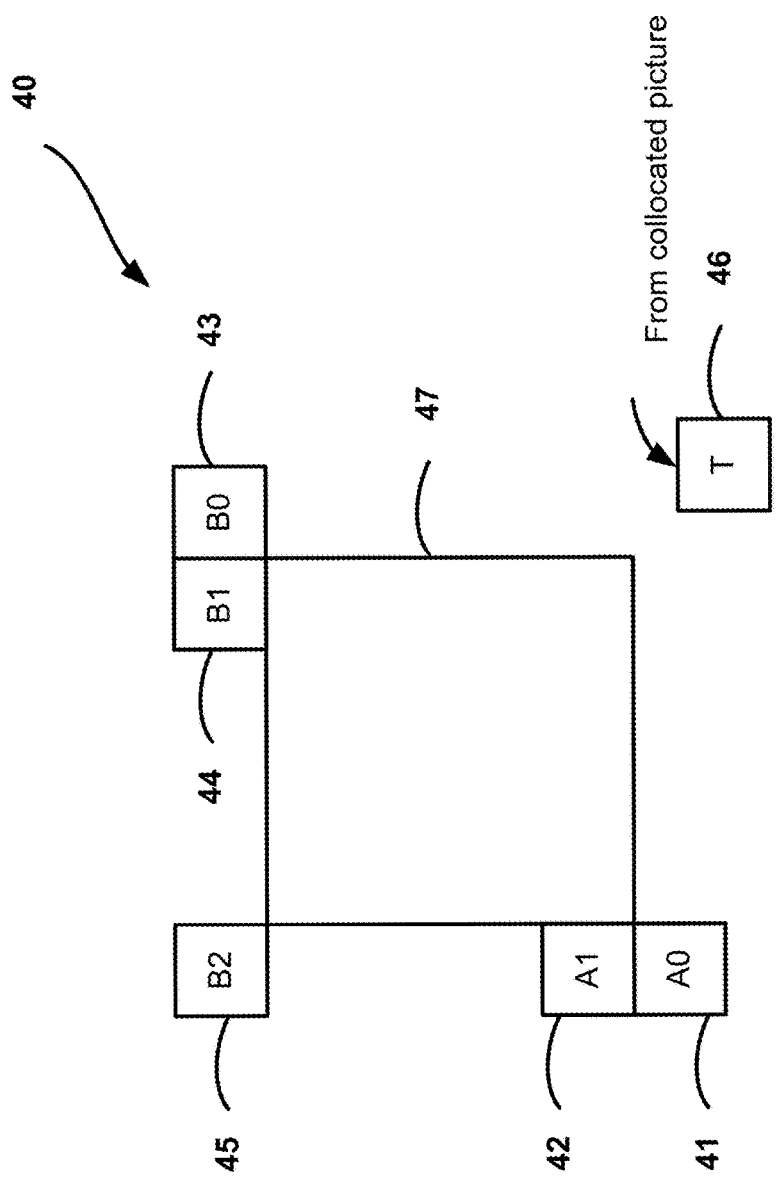
FIG. 5 is a conceptual diagram illustrating an example relationship of neighboring blocks to a current block for prediction of the motion information of the current block.

FIG. 5 shows an example of a current video block 47, five spatial neighboring blocks (41, 42, 43, 44 and 45), and a temporal reference block 46 from another picture but in the same view as the current picture. Temporal reference block 46 may, for example, be a co-located block in a picture of a different temporal instance but the same view as current video block 47. In some examples, current video block 47 and reference video blocks 41-46 may be as generally defined in the HEVC standard currently under development. Reference video blocks 41-46 are labeled A0, A1, B0, B1, B2 and T in accordance with the HEVC standard. Video encoder 20 and video decoder 30 may predict the motion information, including a TMV, of current video block 47 based on the motion information of reference video blocks 41-46 according to a motion information prediction mode, e.g., a merge/skip mode or AMVP mode. As described in greater detail below, the TMVs of video blocks may be used with DMVs for advanced residual prediction according to the techniques of this disclosure.

As illustrated in FIG. 5, video blocks 42, 44, 43, 41, and 45 may be left, above, above-right, below-left, and above-left, respectively, relative to current video block 47. However, the number and locations of neighboring blocks 41-45 relative to current video block 47 illustrated in FIG. 5 are merely examples. The motion information of a different number of neighboring blocks and/or of blocks at different locations may be considered for inclusion in a motion information prediction candidate list for current video block 47.

The spatial relationship of each of spatially-neighboring blocks 42, 44, 43, 41, and 45 to current video block 47 may be described as follows. A luma location (xP, yP) is used to specify the top-left luma sample of the current block relative to the top-left sample of the current picture. Variables nPSW and nPSH denote the width and the height of the current block for luma. The top-left luma sample of spatially-neighboring block 42 is xP−1, yP+nPSH−1. The top-left luma sample of spatially-neighboring block 44 is xP+nPSW−1, yP−1. The top-left luma sample of spatially-neighboring block 43 is xP+nPSW, yP−1. The top-left luma sample of spatially-neighboring block 41 is xP−1, yP+nPSH. The top-left luma sample of spatially-neighboring block 45 is xP−1, yP−1. Although described with respect to luma locations, the current and reference blocks may include chroma components.

Each of spatially-neighboring blocks 41-45 may provide a spatial motion information candidate for predicting the motion information, e.g., TMV, of current video block 47. A video coder, e.g., video encoder 20 (FIG. 1) and/or video decoder 30 (FIG. 1), may consider the motion information of the spatially-neighboring reference blocks in a predetermined order, e.g., a scan order. In the case of 3D-HEVC, for example, the video decoder may consider the motion information of the reference blocks for inclusion in a merging candidate list for the merge mode in the following order: 42, 44, 43, 41, and 45. In the illustrated example, spatially-neighboring blocks 41-45 are to the left of and/or above, current video block 47. This arrangement is typical, as most video coders code video blocks in raster scan order from the top-left of a picture. Accordingly, in such examples, spatially-neighboring blocks 41-45 will typically be coded prior to current video block 47. However, in other examples, e.g., when a video coder codes video blocks in a different order, spatially-neighboring blocks 41-45 may be located to the right of and/or below current video block 47.

Temporal reference block 46 is located within a temporal reference picture coded prior, although not necessarily immediately prior in coding order, to the current picture of current video block 47. Additionally, the reference picture of block 46 is not necessarily prior to the picture of current video block 47 in display order. Reference video block 46 may be generally co-located in the reference picture relative to the location of current video block 47 in the current picture. In some examples, reference video block 46 is located to the right of and below the position of current video block 47 in the current picture, or covers the center position of current video block 47 in the current picture.

Figure 6:
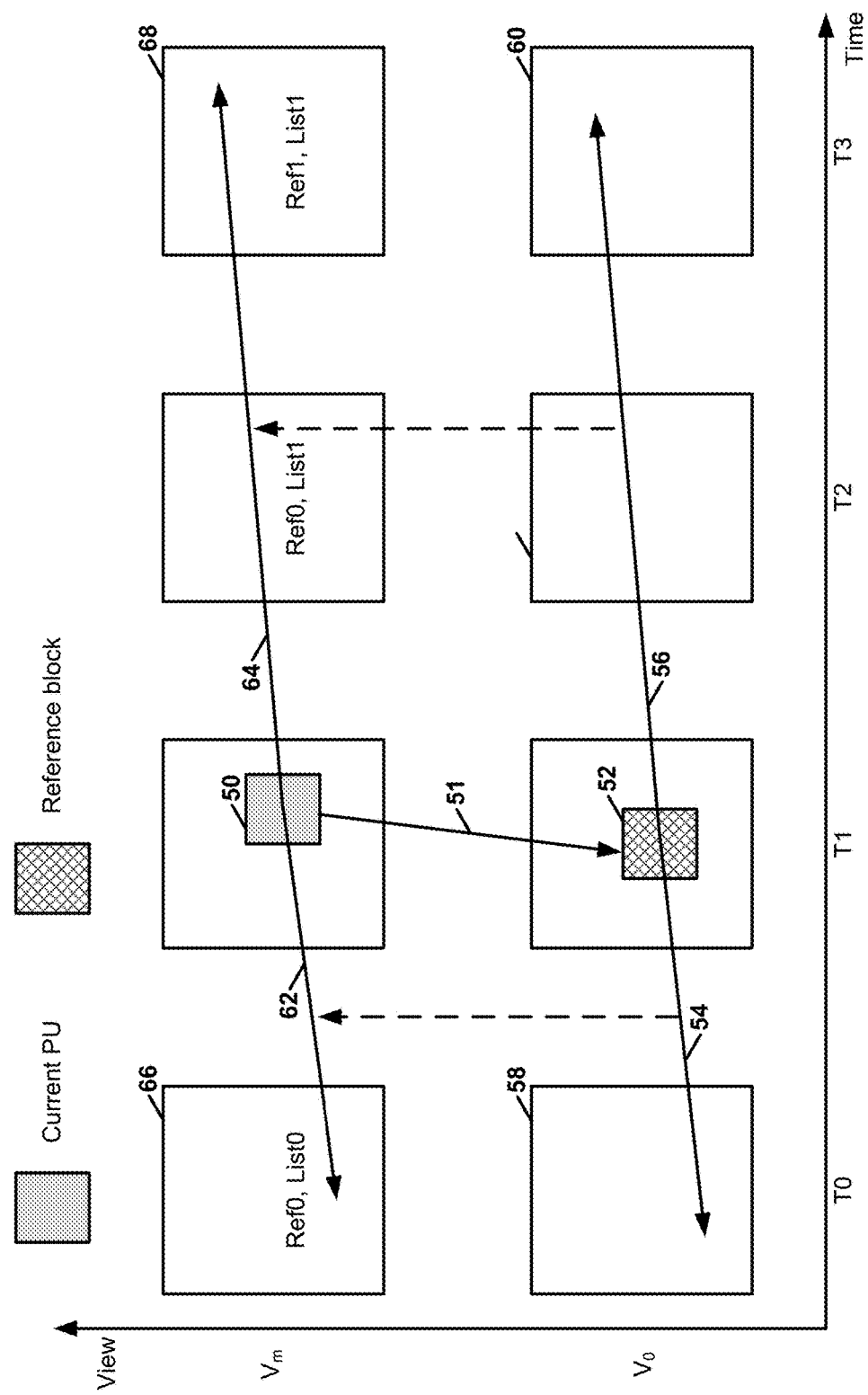
FIG. 6 is a conceptual diagram illustrating an example of derivation of an inter-view predicted motion vector candidate and an inter-view disparity motion vector candidate for prediction of the motion information of the current block.

FIG. 6 is a conceptual diagram illustrating an example of derivation of an inter-view predicted motion vector candidate (IPMVC) and an inter-view disparity motion vector candidate (IDMVC) for prediction of the motion information of a current video block 50, e.g., according to a merge/skip mode or an AMVP mode. When inter-view prediction is enabled, video encoder 20 and/or video decoder 30 may add a new motion vector candidate, IPMVC or IDMVC to the motion information candidate list for current video block 50. The IPMVC may predict a TMV for current video block 50, which video encoder 20 and/or video decoder 30 may use for ARP of current video block 50 or another video block according to the techniques of this disclosure, as described in greater detail below. The IDMVC may predict a DMV for current video block 50, which video encoder 20 and/or video decoder 30 may use for ARP of current video block 50.

In the example of FIG. 6, current block 50 is in current view Vm. Video encoder 20 and/or video decoder 30 may locate a corresponding or reference block 52 in reference view V0 using a disparity vector (DV) 51. The video coder may determine DV 51 based on camera parameters, or according to any of the techniques described herein. For example, the video coder may determine DV 51 for current video block 50 including based on a DMV or DV of a neighboring block, e.g., using Neighboring Block Based Disparity Vector Derivation (NBDV).

If reference block 52 is not intra-coded and not inter-view predicted, and its reference picture, e.g., reference picture 58 or reference picture 60, has a picture order count (POC) value equal to that of one entry in the same reference picture list of current video block 50, video encoder 20 and/or video decoder 30 may derive its motion information (prediction direction, reference pictures, and motion vectors), after converting the reference index based on POC, to be the IPMVC for current video block 50.

In the example of FIG. 6, reference video block 52 is associated with TMV 54 pointing to a first reference picture 58 in the reference view V0 that is specified a first reference picture list (RefPicList0), and TMV 56 pointing to a second picture 60 in the reference view V0 that is specified in a second reference picture list (RefPicList1). The inheritance of TMVs 54 and 56 by current video block 50 is illustrated by the dashed arrows in FIG. 6. Based on the motion information of reference video block 52, the video coder derives the IPMVC for current video block 50 to be at least one of a TMV 62 pointing to a first reference picture 66 in the current view Vm that is specified in a first reference picture list (RefPicList0), e.g., with the same POC in the first reference picture list as reference picture 58, and TMV 64 pointing to a second picture 68 in the current view Vm that is specified in a second reference picture list (RefPicList1), e.g., with the same POC as reference picture 60.

Video encoder 20 and/or video decoder 30 may use TMV 62 and/or TMV 64 for ARP of current video block 50. Video encoder 20 and/or video decoder 30 may also convert DV 51 to an IDMVC for current video block 50, and add the IDMVC to the motion information candidate list for current video block 50 in a different position from the IPMVC. Each of the IPMVC or IDMVC may be referred to as an 'inter-view candidate' in this context.

In the merge/skip mode, the video coder inserts the IPMVC, if available, before all spatial and temporal merging candidates to the merge candidate list. In the merge/skip mode, the video coder inserts the IDMVC before the spatial merging candidate derived from A0 (block 41 of FIG. 5). The conversion of DV 51 to an IDMVC may be considered conversion of DV 51 to a DMV for current video block 50. Video encoder 20 and/or video decoder 30 may use the DMV for ARP of current video block 50.

In some situations, a video coder may derive a DV for a current video block. For example, as described above with reference to FIG. 6, video encoder 20 and/or video decoder 30 may derive DV 51 for current video block 50. In some examples, a video coder may use NBDV derivation to derive the DV for the current video block. NBDV derivation is used as a disparity vector derivation method in 3D-HEVC.

Proposals for 3D-HEVC use a texture-first coding order for all of the views. In other words, for each of the plurality of views in the bitstream, the texture component of is coded, e.g., encoded or decoded, prior to any depth component for the view. In some cases, e.g., for inter-view prediction, a DV is needed to code a video block in a texture component of a view in a particular access unit. However, in texture-first coding, the corresponding depth component of the current video block is not available for determining the DV for the current video block. NBDV derivation may be employed by a video coder, and is proposed for 3D-HEVC, to derive a DV for a current video block in such situations. In the current 3D-HEVC design, the DV derived from NBDV derivation could be further refined by retrieving the depth data from reference view's depth map pointed by the DV from NBDV process.

A DV is used for an estimator of the displacement between two views. Because neighboring blocks share almost the same motion/disparity information in video coding, the current video block can use the motion vector information in neighboring blocks as a good predictor of its motion/disparity information. Following this idea, NBDV derivation uses the neighboring disparity information for estimating the DVs in different views.

According to NBDV derivation, a video coder identifies several spatial and temporal neighboring blocks. Two sets of neighboring blocks are utilized. One set is from spatial neighboring blocks and the other set is from temporal neighboring blocks. The video coder then checks each of the spatial and temporal neighboring blocks in a pre-defined order determined by the priority of the correlation between the current block and the candidate (neighboring) block. When the video coder identifies a DMV, i.e., a motion vector that points from the neighboring candidate block to an inter-view reference picture (in the same access unit, but in a different view), in the motion information of the candidates, the video coder converts the DMV to a DV, and returns the associated view order index. For example, the video coder may set a horizontal component of the DV for the current block equal to a horizontal component of the DMV and may set the vertical component of the DV to 0.

3D-HEVC initially adopted the NBDV derivation techniques proposed in Zhang et al. "3D-CE5.h: Disparity vector generation results," Joint Collaborative Team on Video Coding Extension Development of ITU-T SG 16 WP 3 and ISO/IEC JTC 1/SC 29/WG 11, 1st Meeting: Stockholm, SE, 16-20 Jul. 2012, Doc. JCT3V-A0097 (MPEG number m26052), hereinafter "JCT3V-A0097." JCT3V-A0097 may be downloaded from the following link: http://phenix.int-evey.fr/jct2/doc_end_user/current_document.php?id=89.
The entire content of JCT3V-A0097 is incorporated herein by reference.

In some proposals for 3D-HEVC, when the video coder performs the NBDV derivation process, the video coder checks disparity motion vectors in the temporal neighboring blocks, disparity motion vectors in the spatial neighboring blocks, and then implicit disparity vectors (IDVs) in order. An IDV may be a disparity vector of a spatially- or temporally-neighboring PU that is coded using inter-view prediction. IDVs may also be referred to as derived disparity vectors. An IDV may be generated when a PU employs inter-view prediction, i.e., the candidate for AMVP or merge modes is derived from a reference block in the other view with the help of a disparity vector. Such a disparity vector is called IDV. An IDV may be stored to the PU for the purpose of DV derivation. For instance, even though the block is coded with motion prediction, a derived DV for the block is not discarded for the purpose of coding a following video block. Thus, when the video coder identifies a DMV or an IDV, the video coder may return the identified DMV or IDV.

Implicit disparity vectors (IDVs) were included with a simplified NBDV derivation process described in Sung et al., "3D-CE5.h: Simplification of disparity vector derivation for HEVC-based 3D video coding," Joint Collaborative Team on Video Coding Extension Development of ITU-T SG 16 WP 3 and ISO/IEC JTC 1/SC 29/WG 11, 1st Meeting: Stockholm, SE, 16-20 Jul. 2012, Doc. JCT3V-A0126 (MPEG number m26079), hereinafter "JCT3V-A0126." JCT3V-A0126 may be downloaded from the following link: http://phenix.int-evey.fr/jct2/doc_end_user/current_document.php?id=142.

Further development of an NBDV derivation process for 3D-HEVC was described in Kang et al., "3D-CE5.h: Improvement for disparity vector derivation," Joint Collaborative Team on Video Coding Extension Development of ITU-T SG 16 WP 3 and ISO/IEC JTC 1/SC 29/WG 11, 2nd Meeting: Shanghai, CN, 13-19 Oct. 2012, Doc. JCT3V-B0047 (MPEG number m26736), hereinafter "JCT3V-B0047." JCT3V-B0047 may be downloaded from the following link: http://phenix.it-sudparis.eu/jct2/doc_end_user/current_document.php?id=236.

In JCT3V-B0047, the NBDV derivation process for 3D-HEVC was further simplified by removing the IDVs stored in the decoded picture buffer. Coding gain was also improved with the random access point (RAP) picture selection. The video coder may convert the returned disparity motion vector or IDV to a disparity vector and may use the disparity vector for inter-view prediction and inter-view residual prediction. Random access refers to a decoding of a bitstream starting from a coded picture that is not the first coded picture in the bitstream. The insertion of random access pictures or random access points into a bitstream at regular intervals may enable random access. Example types of random access pictures include Instantaneous Decoder Refresh (IDR) pictures, Clean Random Access (CRA) pictures, and Broken Link Access (BLA) pictures. Hence, IDR pictures, CRA pictures and BLA pictures are collectively referred to as RAP pictures. In some examples, RAP pictures may have NAL unit types are equal to BLA_W_LP, BLA_W_RADL, BLA_N_LP, IDR_W_RADL, IDR_N_LP, RSV_IRAP_VCL22, RSV_IRAP_VCL23, or CRA_NUT.

Techniques for CU-based DV derivation for 3D-HEVC were proposed in Kang et al., "CE2.h: CU-based disparity vector derivation in 3D-HEVC," Joint Collaborative Team on Video Coding Extension Development of ITU-T SG 16 WP 3 and ISO/IEC JTC 1/SC 29/WG 11, 4th Meeting: Incheon, KR, 20-26 Apr. 2013, Doc. JCT3V-D0181 (MPEG number m29012), hereinafter "JCT3V-D0181." JCT3V-D0181 may be downloaded from the following link: http://phenix.it-sudparis.eu/jct3v/doc_end_user/current_document.php?id=866.

When the video coder identifies a DMV or an IDV, the video coder may terminate the checking process. Thus, once the video coder finds a DV for the current block, the video coder may terminate the NBDV derivation process. When the video coder is unable to determine a DV for the current block by performing the NBDV derivation process (i.e., when there is no DMV or IDV found during the NBDV derivation process), the NBDV is marked as unavailable. In other words, it can be considered that the NBDV derivation process returns an unavailable disparity vector.

If the video coder is unable to derive a DV for the current block (i.e., if no disparity vector is found) by performing the NBDV derivation process, the video coder may use a zero DV as the DV for the current PU. The zero DV is a DV having both horizontal and vertical components equal to 0. Thus, even when the NBDV derivation process returns an unavailable result, other coding processes of the video coder that require a DV may use a zero disparity vector for the current block. In some examples, if the video coder is unable to derive a DV for the current block by performing the NBDV derivation process, the video coder may disable inter-view residual prediction for the current block. However, regardless of whether the video coder is able to derive a DV for the current block by performing the derivation NBDV process, the video coder may use inter-view prediction for the current block. That is, if no DV is found after checking all the pre-defined neighboring blocks, a zero disparity vector may be used for inter-view prediction while inter-view residual prediction may be disabled for the corresponding CU.

Figure 7:
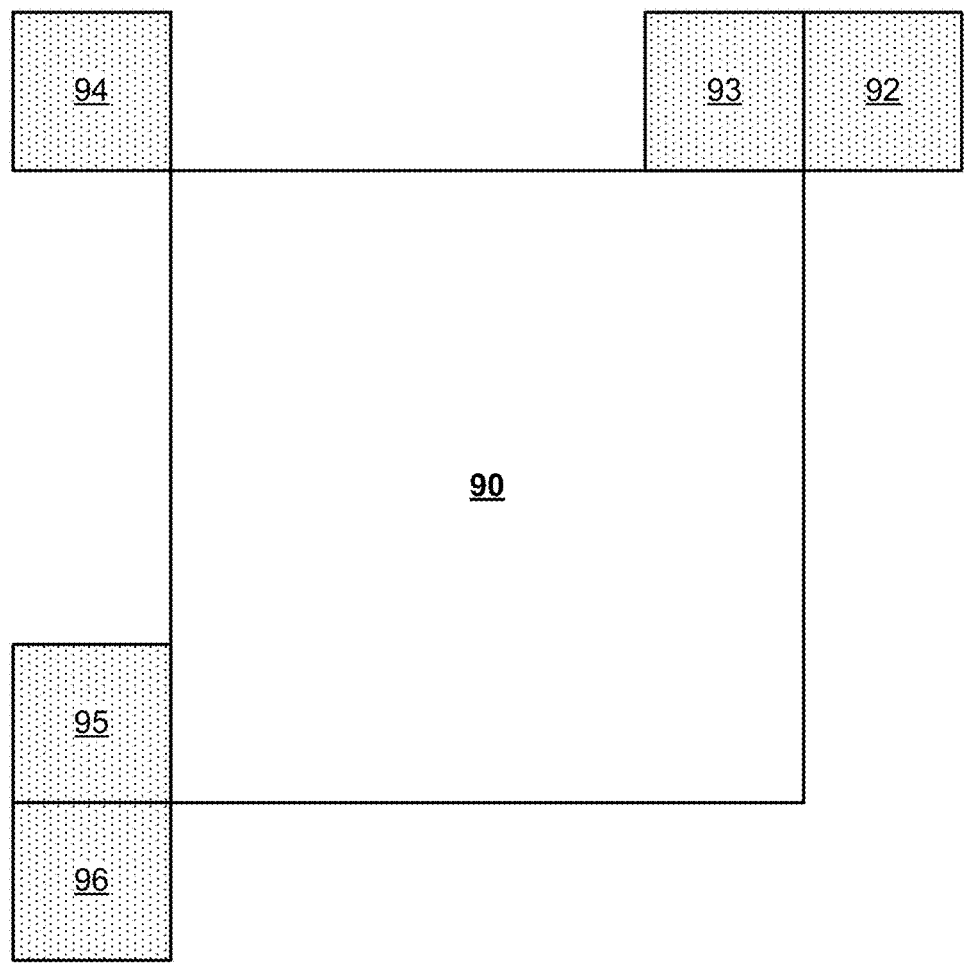
FIG. 7 is a conceptual diagram illustrating example spatial neighboring blocks, from which a disparity vector for a current video block may be derived using Neighboring Block Based Disparity Vector (NBDV) derivation relative to the current video block.

FIG. 7 is a conceptual diagram illustrating example spatial neighboring blocks, from which a DV for a current video block may be derived using NBDV derivation, relative to the current video block 90. The five spatial neighboring blocks illustrated in FIG. 7 are the below-left block 96, the left block 95, above-right block 92, the above block 93, and the above-left block 94 relative to the current video block. The spatial neighboring blocks may be the below-left, left, above-right, above, and above-left blocks of a CU covering current video block. It should be noted that these spatial neighboring blocks for NBDV may be the same as the spatial neighboring blocks used by the video coder for motion information prediction for the current video block such as according to the MERGE/AMVP modes in HEVC. In such cases, no additional memory access by the video coder may be required for NBDV, as the motion information of the spatial neighboring blocks is already considered for motion information prediction for the current video block.

For checking temporal neighboring blocks, a video coder constructs a candidate picture list. In some examples, the video coder may treat up to two reference pictures from current view, i.e., the same view as the current video block, as candidate pictures. The video coder may first insert the co-located reference picture into the candidate picture list, followed by the rest of candidate pictures in the ascending order of reference picture index. When the reference pictures with the same reference index in both reference picture lists are available, the video coder may insert the one in the same reference picture list as the co-located picture prior to the other reference picture from the other reference picture list. In some examples, the video coder may identify three candidate regions for deriving the temporal neighboring blocks from each of the candidate pictures in the candidate picture list. The three candidate regions may be defined as follows:
CPU: A co-located region of the current PU or current CU.
CLCU: A largest coding unit (LCU) covering the co-located region of the current block.
BR: A bottom-right 4×4 block of the CPU.
If the PU that covers the candidate region specifies a DMV, the video coder may determine the DV of the current video unit based on the disparity motion vector of the PU.

As discussed above, in addition to DMVs derived from spatial and temporal neighboring blocks, a video coder may check for IDVs. In the proposed NBDV derivation process for 3D-HTM 7.0 and later versions, the video coder checks DMVs in the temporal neighboring blocks, then DMVs in the spatial neighboring blocks, and then the IDVs, in order. Once, the DMV or IDV is found, the process is terminated. In addition, the number of spatial neighboring blocks checked in the NBDV derivation process is further reduced to two.

When the video coder checks a neighboring PU (i.e., a spatially- or temporally-neighboring PU), the video coder may check first whether the neighboring PU has a disparity motion vector. If none of the neighboring PUs has a disparity motion vector, the video coder may determine whether any of the spatially-neighboring PUs has an IDV. If one of the spatially-neighboring PUs has an IDV and the IDV is coded as merge/skip mode, the video coder may terminate the checking process and may use the IDV as the final disparity vector for the current PU.

As indicated above, a video coder may apply an NBDV derivation process to derive a DV for a current block (e.g., a CU, PU, etc.). The disparity vector for the current block may indicate a location in a reference picture (i.e., a reference component) in a reference view. In some 3D-HEVC designs, the video coder is allowed to access depth information for the reference view. In some such 3D-HEVC designs, when the video coder uses the NBDV derivation process to derive the DV for the current block, the video coder may apply a refinement process to further refine the disparity vector for the current block. The video coder may refine the DV for the current block based on the reference picture's depth map. The video coder may use a similar refinement process to refine a DMV for backward view synthesis prediction. In this way, the depth can be used to refine the DV or DMV to be used for backward view synthesis prediction. This refinement process may be referred to herein as NBDV refinement ("NBDV-R"), the NBDV refinement process, or depth-oriented NBDV (Do-NBDV).

When the NBDV derivation process returns an available disparity vector (e.g., when the NBDV derivation process returns a variable that indicates that the NBDV derivation process was able to derive a disparity vector for the current block based on a disparity motion vector or an IDV of a neighboring block), the video coder may further refine the disparity vector by retrieving depth data from the reference view's depth map. In some examples, the refinement process includes the following two steps:
1) Locate a corresponding depth block by the derived DV in the previously coded reference depth view, such as the base view; the size of the corresponding depth block is the same as that of current PU.
2) Select one depth value from four corner pixels of the corresponding depth block and convert it to the horizontal component of the refined DV. The vertical component of the DV is unchanged.

The refined DV may be used for inter-view prediction for the current video block, while the unrefined DV may be used for inter-view residual prediction for the current video block. In addition, the refined DV is stored as the motion vector of one PU if it is coded with backward view synthesis prediction (BVSP) mode, which is described in greater detail below. In proposed NBDV process for 3D-HTM 7.0 and later versions, the depth view component of the base view is accessed regardless of the value of view order index derived from the NBDV process.

Sub-PU level inter-view motion prediction techniques to generate a new merging candidate have been proposed in An et al., "3D-CE3: Sub-PU level inter-view motion prediction," Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013, Doc. JCT3V-F0110, hereinafter "JCT3V-F0110."JCT3V-F0110 may be downloaded from the following link: http://http://phenix.it-sudparis.eu/jct2/doc_end_user/current_document.php?id=1447. The new candidate is added to the merge candidate list.

Figure 8:
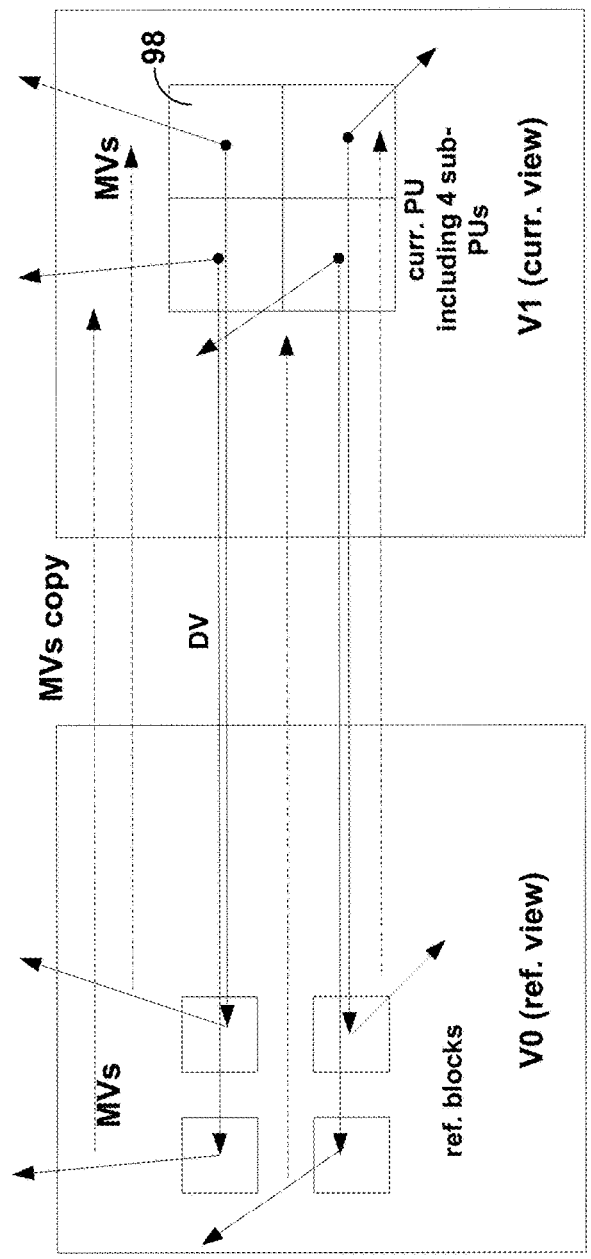
FIG. 8 is a conceptual diagram illustrating sub-prediction unit (PU) inter-view motion prediction.

FIG. 8 is a conceptual diagram illustrating sub-prediction unit (PU) inter-view motion prediction. As shown in FIG. 8, current PU 98 in current view V1 may be split into multiple sub-PUs (e.g., four sub-PUs). A disparity vector for each sub-PU may be used to locate corresponding reference blocks in a reference view V0. Video encoder 20 and/or video decoder 30 may be configured to copy (i.e., reuse) motion vectors associated with each of the reference blocks for use with the corresponding sub-PUs of current PU 8.

In one example, the new candidate, named sub-PU merging candidate, is derived using the following techniques. First, denote the size of current PU by nPSW×nPSH, the signaled sub-PU size by N×N. and the final sub-PU size by subW×subH. The current PU may be divided into one or multiple sub-PUs depending on the PU size and signaled sub-PU size as follows:

$$subW=\max(N,nPSW)!=N?N:nPSW;$$

$$subH=\max(N,nPSH)!=N?N:nPSH;$$

Video encoder 20 and/or video decoder 30 may set default motion vector tmvLX to (0, 0) and reference index refLX to −1 for each reference picture list (with X representing either reference picture list 0 or reference picture list 1). For each sub-PU in the raster scan order, the following applies:

Add the DV obtained from a DoNBDV derivation process or NBDV process to the middle position of current sub-PU to obtain a reference sample location (xRefSub, yRefSub) by:

xRefSub=Clip3(0,PicWidthInSamplesL−1,xPSub+
nPSWsub/2+((mvDisp[0]+2)>>2))

yRefSub=Clip3(0,PicHeightInSamplesL−1,yPSub+
nPSHSub/2+((mvDisp[1]+2)>>2))

A block in the reference view that covers (xRefSub, yRefSub) is used as the reference block for current sub-PU.

For the identified reference block:
1) if the identified reference block is coded using temporal motion vectors, the following apply:
The associated motion parameters can be used as candidate motion parameters for the current sub-PU.
tmvLX and refLX are updated to the motion information of the current sub-PU.
If current sub-PU is not the first one in the raster scan order, the motion information (tmvLX and refLX) is inherited by all the previous sub-PUs.
2) otherwise (the reference block is intra coded), the motion information of current sub-PU is set to tmvLX and refLX.

Different sub-PU block sizes may be used for in the above-described techniques for sub-PU level inter-view motion prediction, including 4×4, 8×8, and 16×16. The size for the sub-PU block may be signaled in a parameter set, such as a view parameter set (VPS).

Advanced residual prediction (ARP) is a coding tool that seeks to exploit the residual correlation between views in order to provide additional coding efficiency. In ARP, a residual predictor is produced by aligning the motion information at the current view for motion compensation in the reference view. In addition, weighting factors are introduced to compensate the quality differences between views. When ARP is enabled for one block, the difference between current residual and the residual predictor is signaled. That is, the residual for a current block is subtracted from the residual of the residual predictor, and the resulting difference is signaled. In some proposals for 3D-HEVC, ARP is only applied to inter-coded CUs with a partition mode equal to Part_2N×2N.

Figure 9:
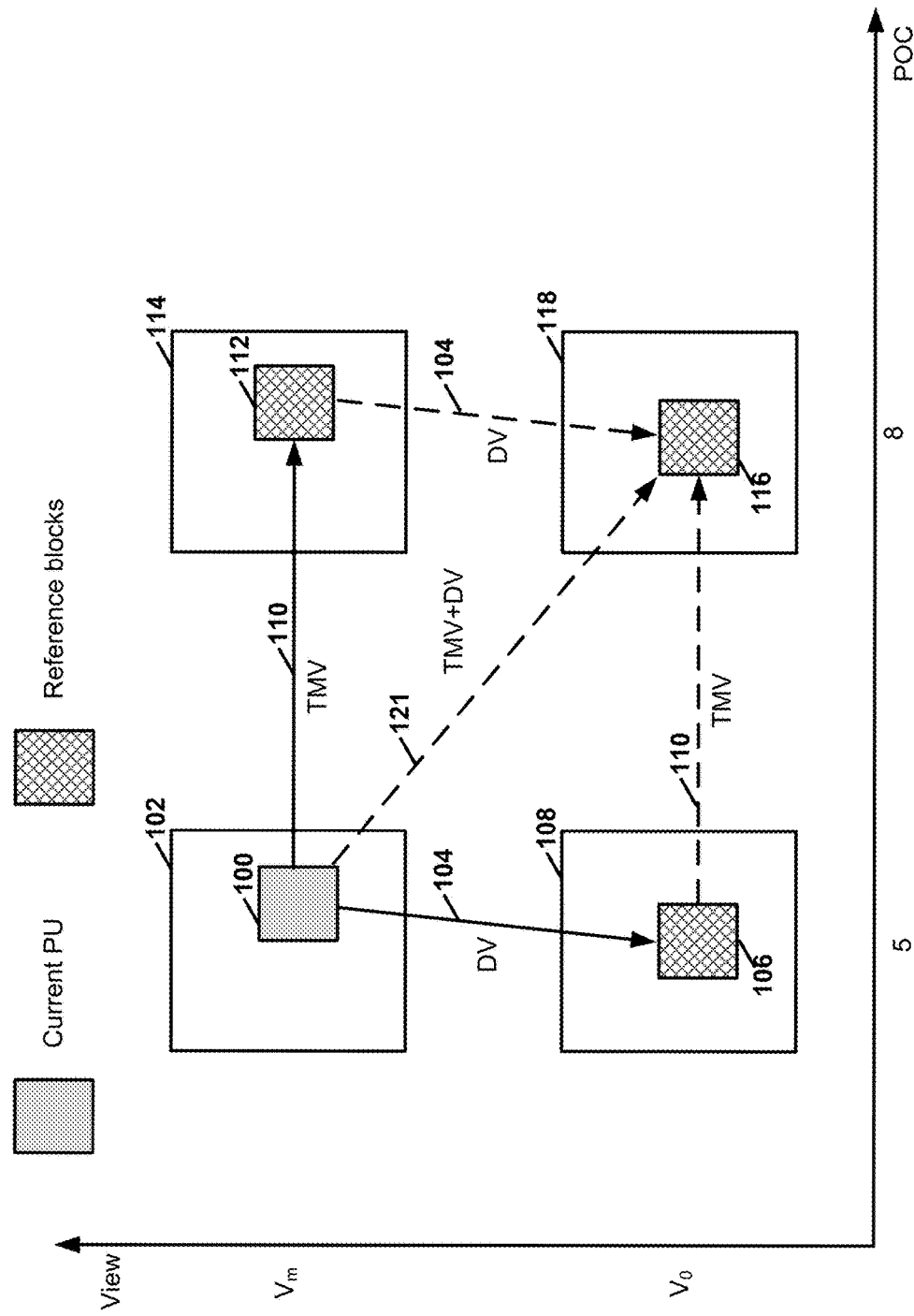
FIG. 9 is a conceptual diagram illustrating an example prediction structure for temporal Advanced Residual Prediction (ARP) of a temporally-predicted video block.

FIG. 9 is a conceptual diagram illustrating an example prediction structure for examples proposals for temporal ARP) of a temporally-predicted video block. ARP applied to CUs with partition mode equal to Part_2N×2N was adopted in the 4th JCT3V meeting, as proposed in Zhang et al., "CE4: Advanced residual prediction for multiview coding," Joint Collaborative Team on Video Coding Extension Development of ITU-T SG 16 WP 3 and ISO/IEC JTC 1/SC 29/WG 11, 4th Meeting: Incheon, KR, 20-26 Apr. 2013, Doc. JCT3V-D0177 (MPEG number m29008), hereinafter "JCT3V-D0177." JCT3V-D0177 may be downloaded from the following link: http://phenix.it-sudparis.eu/jct3v/doc_end_user/current_document.php?id=862.

As shown in FIG. 9, a video coder invokes or identifies the following blocks in the prediction of the residual for a current video block 100 in a current picture 102 of the current, e.g., dependent, view Vm.
1) Current video block 100 (in view $V_m$): Curr
2) An inter-view reference video block 106 in an inter-view reference picture 108 of a reference/base view ($V_0$ in FIG. 9): Base. The video coder derives inter-view reference video block 106 based on DV 104 of current video block 100 (Curr). The video coder may determine DV 104 using NBDV derivation, as described above.
3) A temporal reference video block 112 in a temporal reference picture 114 in the same view ($V_m$) as the current video block 100 (Curr): CurrTRef. The video coder derives temporal reference video block 112 based on the TMV 110 of the current video block 100. The video coder may determine TMV 110 using any of the techniques described herein.
4) A temporal reference video block 116 in a temporal reference picture 118 in the reference view, i.e., the same view as inter-view reference video block 106 (Base): BaseTRef. A video coder derives temporal reference video block 116 in the reference view using TMV 110 of current video block 100 (Curr). A vector 121 of TMV+DV may identify temporal reference video block 116 (BaseTRef) relative to current video block 100 (Curr).

When video encoder 20 temporally inter predicts current video block 100 based on temporal reference video block 112, which the video encoder 20 identifies using TMV 110, video encoder 20 determines the pixel-by-pixel differences between current video block 100 and temporal reference video block 112 as a residual block. Absent ARP, video encoder 20 would transform, quantize, and entropy encode the residual block. Video decoder 30 would entropy decode an encoded video bitstream, perform inverse quantization and transformation to derive the residual block, and apply the residual block to a reconstruction of reference video block 112 to reconstruct current video block 100.

Using ARP, the video coders determine a residual predictor block that predicts the values of the residual block, i.e., predicts the difference between current video block 100 (Curr) and temporal reference video block 112 (CurrTRef). Video encoder 20 may then only need to encode a difference between the residual block and the residual predictor block, reducing the amount of information included in the encoded video bitstream for encoding current video block 100. In the temporal ARP example of FIG. 9, the predictor for the residual of current video block 100 is determined based on blocks in the reference/base view ($V_0$) that correspond to current video block 100 (Curr) and temporal reference video block 112 (CurrTRef), and are identified by DV 104. The difference between these corresponding blocks in the reference view may be a good predictor of the residual, i.e., the difference between current video block 100 (Curr) and temporal reference video block 112 (CurrTRef). In particular, the video coders identify inter-view reference video block 106 (Base) and a temporal reference video block 116 (BaseTRef) in the reference view, and determine the residual predictor block based on the difference between inter-view reference video block 106 and temporal reference video block 116 (BaseTRef−Base), wherein the subtraction operation applies to each pixel of the denoted pixel arrays. In some examples, a video coder may apply a weighting factor, w, to the residual predictor. In such examples, the final predictor of the current block, i.e., the reference block summed with the residual predictor block, may be denoted as: CurrTRef+w*(BaseTRef−Base).

Figure 10:
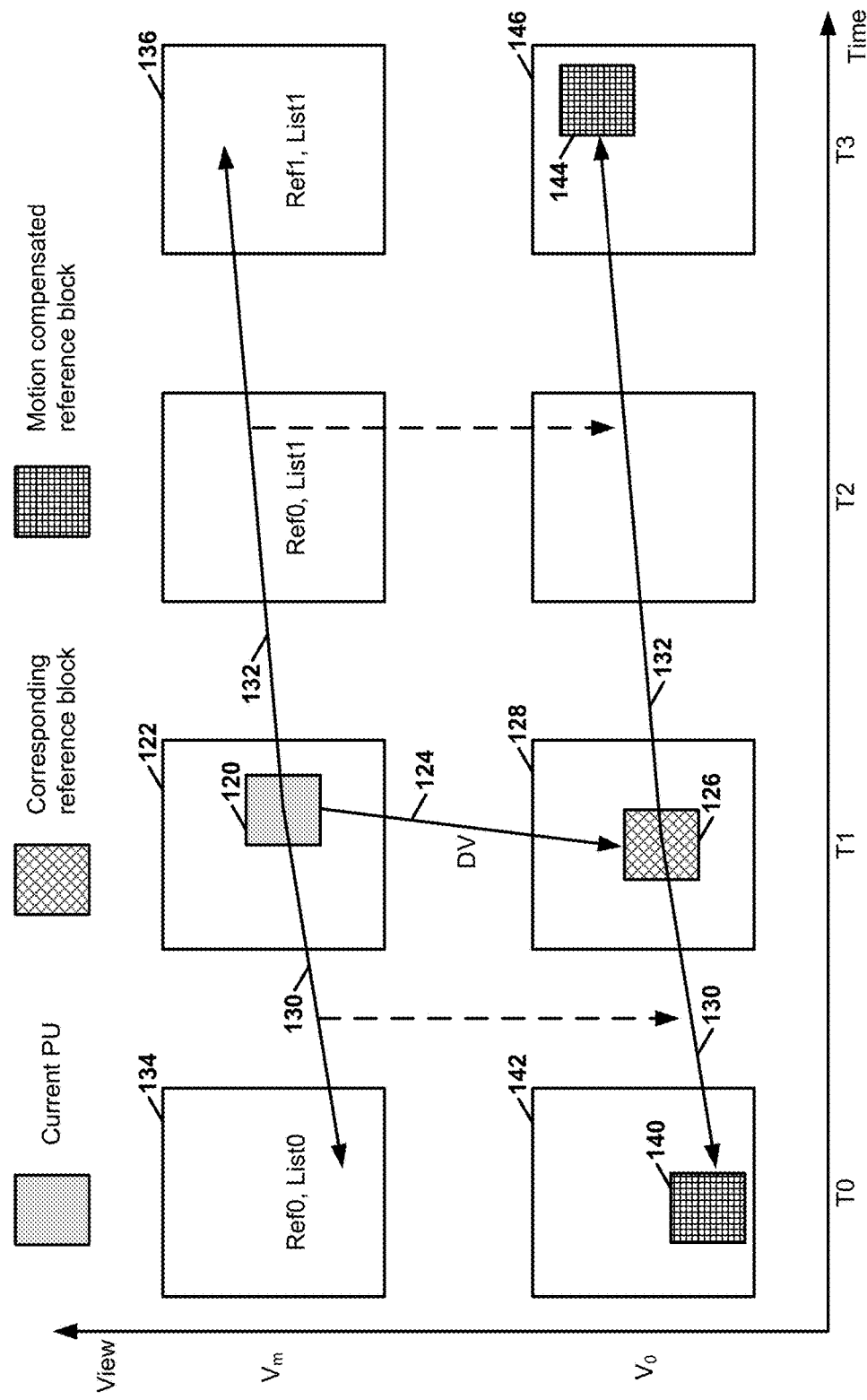
FIG. 10 is a conceptual diagram illustrating an example bi-directional prediction structure for temporal ARP.

FIG. 10 is a conceptual diagram illustrating an example bi-directional prediction structure for temporal ARP of a current video block 120 in a current view (Vm). The above descriptions and FIG. 9 illustrate uni-directional prediction. When extending ARP to the case of bi-directional prediction, the video coder may apply the above techniques to one or both of the reference picture lists in order to identify a residual predictor block for current video block 120. In particular, the video coder may check one or both of the reference lists for current video block 120 to determine if one of them contains a TMV usable for temporal ARP. In the example illustrated by FIG. 10, current video block 120 is associated with a TMV 130 pointing to a first temporal reference picture 134 in a first reference picture list (RefPicList0), and a TMV 132 pointing to a second temporal reference picture 136 is a second reference picture list (RefPicList1).

In some examples, a video coder will check the reference picture lists according to a checking order to determine whether one of them includes a TMV usable for temporal ARP, and need not check a second list according to the checking order if a first list includes such a TMV. In some examples, a video coder will check both reference picture lists and, if both lists include a TMV, determine which TMV to use, e.g., based on a comparison of the resulting residual predictors produced using the TMVs relative to the residual of the current video block. Notably, according to current proposals for ARP, e.g., JCT3VC-D0177, when the current block uses an inter-view reference picture (in a different view) for one reference picture list, the residual prediction process is disabled.

As illustrated in FIG. 10, the video coder may use a DV 124 identified for current video block 120, e.g., according to an NBDV derivation process, to identify a corresponding inter-view reference video block 126 (Base) in an inter-view reference picture 128 that is in a different, reference view (V$_0$), but is in the same access unit as the current picture 122. The video coder may also use TMVs 130 and 132 for current video block 120 to identify the temporal reference blocks (BaseTRef) for the inter-view reference video block 126 (Base) in various temporal reference pictures of the reference view in both reference picture lists, e.g., RefPicList0 and RefPicList1. In the example of FIG. 10, the video coder identifies temporal reference video block (BaseTRef) 140 in temporal reference picture 142 in a first reference picture list, e.g., RefPicList0, and temporal reference video block (BaseTRef) 144 in temporal reference picture 146 in a second reference picture list, e.g., RefPicList1, based on TMVs 130 and 132 of the current video block 120.

The use of TMVs 130 and 132 of the current video block 120 in the reference view is illustrated by dashed arrows in FIG. 10. In FIG. 10, temporal reference video blocks 140 and 144 in the reference view are referred to as motion compensated reference blocks due to their identification based on TMVs 130 and 132. A video coder may determine a residual predictor block for current video block 120 based on a difference between temporal reference video block 140 and inter-view reference video block 126, or based on a difference between temporal reference video block 144 and inter-view reference video block 126.

To reiterate, the proposed temporal ARP process at the decoder side can be described (with reference to FIG. 10) as follows:

1. Video decoder 30 obtains a DV 124 as specified in the current 3D-HEVC, e.g., using NBDV derivation, pointing to a target reference view (V$_0$). Then, in the picture 128 of the reference view within the same access unit, video decoder 30 identifies the corresponding inter-view reference video block 126 (Base) by DV 124.
2. Video decoder 30 re-uses the motion information, e.g., TMV 130, 132, of current video block 120 to derive the motion information for corresponding inter-view reference video block 126. Video decoder 30 may apply motion compensation for the corresponding inter-view reference video block 126 based on TMV 130, 132 of current video block 120 and derived reference picture 142, 146 in the reference view for reference video block 126, to identify a motion compensated temporal reference video block 140, 144 (BaseTRef) and determine the residual predictor block by determining BaseTRef−Base. The relationship among current block, corresponding block (Base) and motion compensated block (BaseTRef) is shown in FIGS. 9 and 10. In some examples, the reference picture in the reference view (V$_0$) which has the same POC (Picture Order Count) value as the reference picture of current view (V$_m$) is selected as the reference picture of the corresponding block.
3. Video decoder 30 may apply a weighting factor w to the residual predictor block to get a weighted residual predictor block, and add the values of the weighted residual block to the predicted samples to reconstruct the current video block 120.

Figure 11:
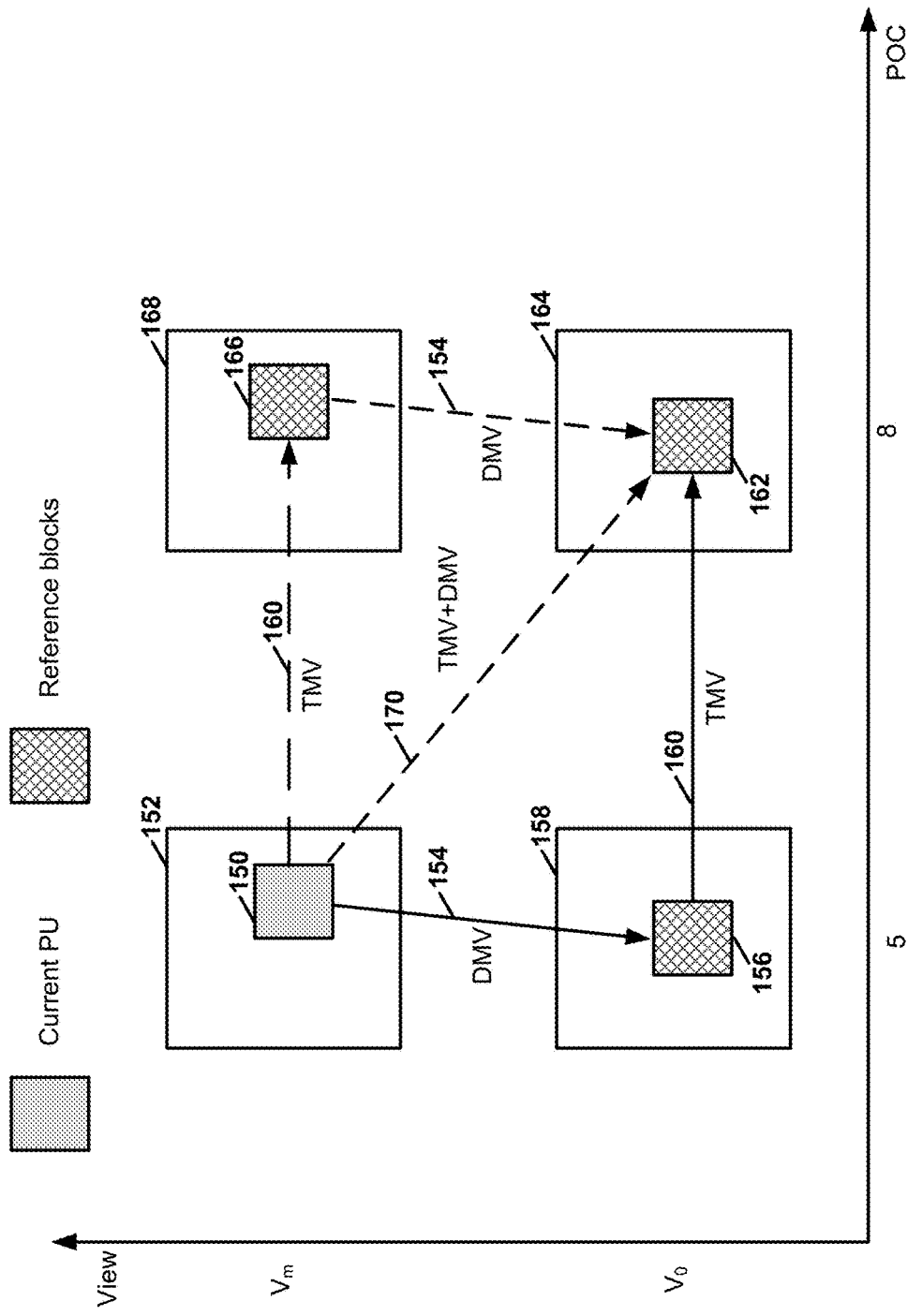
FIG. 11 is a conceptual diagram illustrating an example prediction structure for inter-view ARP of an inter-view predicted video block according to the techniques described in this disclosure.

FIG. 11 is a conceptual diagram an example prediction structure for inter-view ARP of an inter-view predicted video block according to the techniques described in this disclosure. The techniques related to FIG. 11 were proposed in Zhang et al., "CE4: Further improvements on advanced residual prediction," Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013, hereinafter "JCT3V-F0123." JCT3V-F0123 may be downloaded from the following link: http:// http://phenix.it-sudparis.eu/jct2/doc_end_user/current-_document.php?id=1460.

According to the example technique illustrated in FIG. 11, a video coder, e.g., video encoder 20 and/or video decoder 30, may use an inter-view residual from a different access unit to predict the residual of the current block, which is inter-view predicted. In contrast to proposals for ARP in which ARP is not performed when the motion vector of the current block is a DMV, and is only performed when the motion vector for the current video block is a TMV, the example technique of FIG. 11 uses the DMV to perform ARP.

In particular, the example technique of FIG. 11 may be performed by a video coder, e.g., video encoder 20 or video decoder 30, when the motion vector of the current video block 150 (Curr) in a current picture 152 is a DMV 154, and the inter-view reference video block 156 (Base) in an inter-view reference picture 158 in the reference view (V0) contains at least one TMV 160. In some examples, DMV 154 may be a DV that was converted to a DMV to act as an IDMVC for motion information prediction of current video block 150.

The video coder identifies the inter-view reference video block 156 (Base) in the inter-view reference picture 158 using the DMV 154 for current video block 150. The video coder uses a TMV 160 and associated reference picture, e.g., a temporal reference picture 164 in the reference view ($V_0$), of inter-view reference video block 156 together with the DMV to identify a temporal reference video block 162 (BaseTRef) in temporal reference picture 164 in the reference view ($V_0$). The identification of temporal reference video block 162 (BaseTRef) based on TMV 160 and DMV 154 is represented by dashed vector 170 (TMV+DMV). The video coder also uses TMV 160 to identify a temporal reference video block 166 (CurrTRef) in a temporal reference picture 168 in the current view ($V_m$). Temporal reference video block 162 (BaseTRef) in the reference view ($V_0$) and temporal reference video block 166 (CurrTRef) in the current view ($V_m$) may be within the same access unit, i.e., temporal reference picture 164 in the reference view ($V_0$) and temporal reference picture 168 in the current view ($V_m$) may be in the same access unit.

The video coder, e.g., video encoder 20 and/or video decoder 30, may then calculate the inter-view residual predictor block in a different access unit from current video block 150 based on the pixel-by-pixel difference between these two latter blocks, i.e., the difference between temporal reference video block 166 in the current view and temporal reference video block 162 in the reference view, or CurrTRef−BaseTRef. The difference signal, denoted as the inter-view residual predictor, can be used to predict the residual of current video block 150. The prediction signal of current video block 150 may be the sum of the inter-view predictor, i.e., the inter-view reference video block 156 (Base), and the predicted inter-view residual in a different access unit determined based on the difference between temporal reference video block 166 in the current view and temporal reference video block 162 in the reference view. In some examples, a weighting factor w is applied to the predicted inter-view residual in the different access unit. In such examples, the prediction signal of current video block 150 may be: Base+w*(CurrTRef−BaseTRef).

In some examples, the video coder may determine a target reference picture in a target access unit for inter-view ARP, e.g., similar to the determination of a target reference picture for temporal ARP, as discussed above. In some examples, as discussed above with reference to JCT3V-D0177, the target reference picture for each reference picture list is the first reference picture in the reference picture list. In other examples, the target reference picture, e.g., target POC, for one or both reference picture lists may be signaled from video encoder 20 to video decoder 30, e.g., on a PU, CU, slice, picture, or other basis. In other examples, the target reference picture for each reference picture list is the temporal reference picture in the reference picture list which has the smallest POC difference compared to current block and smaller reference picture index. In other examples, the target reference picture for two reference picture lists is the same.

If the picture containing the temporal reference video block in the reference view indicated by TMV 160 is in a different access unit (time instance) then the target ARP reference picture, the video coder may scale TMV 160 to the target reference picture, e.g., target reference picture 164, to identify temporal reference video block 162 (BaseTRef) in the reference view for inter-view ARP. In such examples, the video coder locates temporal reference video block 162 in the access unit containing the target ARP reference picture. The video coder may scale TMV 160 by POC scaling. In addition, the scaled TMV is used to identify the temporal reference video block (CurrTRef) 166 in current view which is located in the target ARP reference picture.

In some examples, the video coder scales TMV 160 to the LX (X being 0 or 1) target reference picture, where LX corresponds to the RefPicListX of the PU that includes the TMV. In some examples, the video coder may scale TMVs from either or both of RefPicList0 or RefPicList1 to the L0 or L1 target reference picture, respectively. In some examples, the video coder scales TMV 160 to the LX target reference picture, wherein X satisfies the condition that DMV 154 of current video block 150, e.g., the current PU, corresponds to RefPicListX.

Similarly, in some examples, the video coder scales DMV 154 to a target reference view for ARP prior to identifying inter-view reference video block 156 in reference picture 158 in the target reference view. The video coder may scale DMV 154 by view order difference scaling. The target reference view may be predetermined and known by video encoder 20 and video decoder 30, or may be signaled from video encoder 20 to video decoder 30, e.g., on a PU, CU, slice, picture, or other basis.

In some examples of inter-view ARP, the video coder, e.g., video encoder 20 and/or video decoder 30, may derive the prediction signal for current block 150 using the same prediction structure and identified reference video blocks 156, 162 and 166 illustrated in FIG. 11, but determine the residual predictor block based on the difference between the reference blocks 156 and 162 in the reference view, rather than the reference blocks 162 and 166 in the different access unit. In such examples, the video coder may apply a weighting factor to other sample arrays, e.g., the difference between the reference blocks 156 and 162 in the reference view, and accordingly derive the prediction signal for current video block 150 as follows: CurrTRef+w*(Base−BaseTRef). In some examples of inter-view ARP, the video coder may use various interpolation filters, including bilinear filters, to derive reference video blocks 156, 162 and 166 if they are aligned with fractional pixel positions.

Although FIG. 11 illustrates inter-view ARP examples in which the temporal reference video blocks in the current and reference views are identified using the TMV associated with the inter-view reference block and associated reference picture of the inter-view reference video block, in other examples, other TMVs and associated reference pictures may be used to identify the temporal reference video blocks in the current and reference views. For example, if the DMV of the current video block is from a first reference picture list (e.g., RefPicList0 or RefPicList1) of the current video block, a video coder may use a TMV corresponding to the second reference picture list of current block and associated reference picture from a second reference picture list (e.g., the other of RefPicList0 or RefPicList1) of the current video block. In such examples, the video coder may identify the temporal reference video block in the current view in the reference picture associated with the TMV, or scale the TMV to a target access unit and target reference picture for ARP to identify the temporal reference video block in the current view. In such examples, the video coder may identify the temporal reference video block in the reference view in a reference picture that is in the same access unit as the reference picture in which the temporal reference video block in the current view was located. In other examples, rather than the TMV of the inter-view reference video block or the TMV of the other reference picture list of the current video block, a video coder may similarly use a TMV and associated reference picture derived from the motion information of spatial or temporal neighboring video blocks of the current video block to identify the temporal reference video blocks in the current and reference views for ARP.

In the following description, if the corresponding reference for one reference picture list is a temporal reference picture and ARP is applied, the ARP process is denoted as temporal ARP. Otherwise, if the corresponding reference for one reference picture list is an inter-view reference picture and ARP is applied, the ARP process is denoted as inter-view ARP.

In some proposals for ARP, three weighting factors may be used, i.e., 0, 0.5 and 1. The weighting factor leading to minimal rate-distortion cost for the current CU is selected as the final weighting factor, and the corresponding weighting factor index (0, 1 and 2 which correspond to weighting factor 0, 1, and 0.5, respectively) is transmitted in the bitstream at the CU level. All PU predictions in one CU share the same weighting factor. When the weighting factor is equal to 0, ARP is not used for the current CU.

Additional aspects related to ARP for 3D-HEVC are described in Zhang et al., "3D-CE4: Advanced residual prediction for multiview coding," Joint Collaborative Team on Video Coding Extension Development of ITU-T SG 16 WP 3 and ISO/IEC JTC 1/SC 29/WG 11, 3rd Meeting: Geneva, CH, 17-23 Jan. 2013, Doc. JCT3V-C0049 (MPEG number m27784), hereinafter "JCT3V-C0049." JCT3V-C0049 may be downloaded from the following link: http://phenix.int-evey.fr/jct3v/doc_end_user/current_document.php?id=487.

In JCT3V-C0049, the reference pictures of different PUs coded with non-zero weighting factors may be different from PU to PU (or current video block to current video block). Therefore, different pictures from the reference view may need to be accessed to generate the motion-compensated block (BaseTRef), e.g., temporal reference video blocks 116, 140 and 144 in FIGS. 9 and 10, or the corresponding inter-view reference video block in the reference view (Base), e.g., inter-view reference video blocks 106 and 126 in FIGS. 9 and 10.

When the weighting factor is unequal to 0, for a temporal residual, the motion vectors of the current PU are scaled towards a fixed picture before performing motion compensation for both residual and residual predictor generation processes. When ARP is applied to an inter-view residual, the temporal motion vectors of the reference block (e.g., block 156 in FIG. 11) are scaled towards a fixed picture before performing motion compensation for both residual and residual predictor generation processes. For both cases (i.e., a temporal residual or inter-view residual), the fixed picture is defined as the first available temporal reference picture of each reference picture list. When the decoded motion vector does not point to the fixed picture, it is first scaled and then used to identify CurrTRef and BaseTRef.

Such a reference picture used for ARP is called a target ARP reference picture. Note that when a current slice is a B slice, the target ARP reference picture is associated with one particular reference picture list. Therefore, two target ARP reference pictures may be utilized.

An availability check of target ARP reference pictures may be performed as follows. First, denote the target ARP reference picture associated with one reference picture list X (with X being 0 or 1) by RpRefPicLX, and denote the picture in the view with view order index equal to the one derived from NBDV derivation process, and with the same POC value of RpRefPicLX, by RefPicInRefViewLX.

When one of the following condition is false, ARP is disabled for reference picture list X:
RpRefPicLX is unavailable
RefPicInRefViewLX is not stored in decoded picture buffer
RefPicInRefViewLX is not included in any of the reference picture lists of the corresponding block (e.g., block 106 in FIG. 9 or block 156 in FIG. 11) located by the DV from NBDV derivation process or the DMV associated with current block, ARP is disabled for this reference picture list.

When ARP is applied, a bi-linear filter may be used when generating the residual and residual predictor. That is, e.g., blocks 106, 112, and 116 in FIG. 9 are generated using a bi-linear filter.

Figure 12:
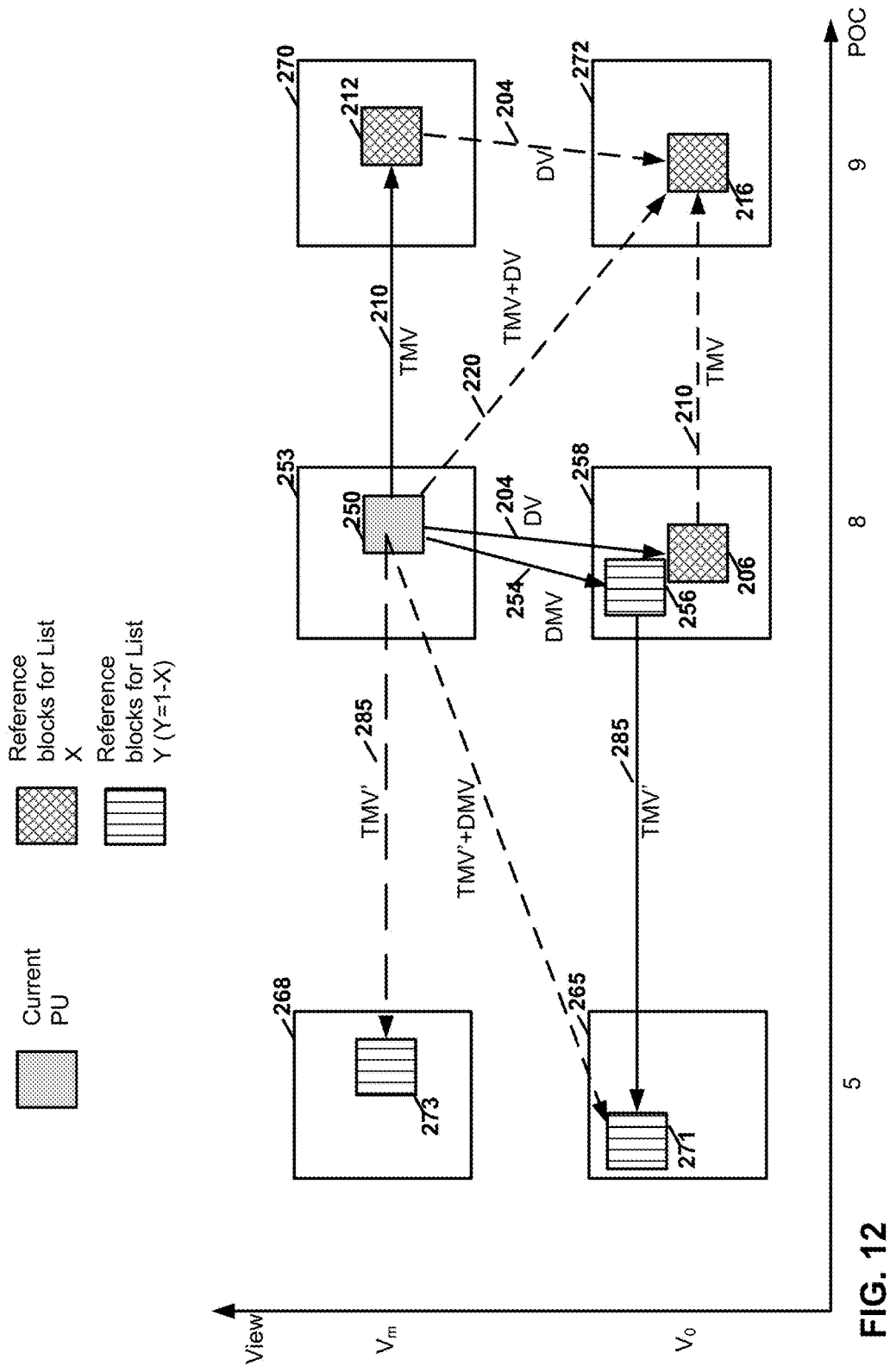
FIG. 12 is a conceptual diagram illustrating an example prediction structure for bi-directional ARP using inter-view prediction for one reference picture list and temporal prediction for another reference picture list.

FIG. 12 is a conceptual diagram illustrating an example prediction structure for bi-directional ARP using inter-view prediction for one reference picture list and temporal prediction for another reference picture list. The example technique of FIG. 12 may be performed by video encoder 20 and/or video decoder 30 when one prediction direction for the bi-directional prediction of current video block 250 uses temporal prediction (e.g., for reference picture list X), and the other prediction direction of current video block 250 uses inter-view prediction (e.g., for reference picture list Y (Y=1−X)).

In the example of FIG. 12, current video block 250 may be associated with a TMV 210 and a DMV 254. Video encoder 20 and/or video decoder 30 may be configured to identify and access reference blocks for reference picture list X (i.e., a first prediction direction) in a similar manner as described above with reference to FIG. 9.

Video encoder 20 and/or video decoder 30 identify the following blocks in the prediction of the residual for a current video block 250 in a current picture 253 of the current, e.g., dependent, view Vm. Video encoder 20 and/or video decoder 30 identify an inter-view reference video block 206 (BaseX) in an inter-view reference picture 258 of a reference/base view ($V_0$ in FIG. 12). Video encoder 20 and/or video decoder 30 identify inter-view reference video block 206 based on DV 204 of current video block 250 (Curr). Video encoder 20 and/or video decoder 30 may determine DV 204 using NBDV derivation, as described above.

Video encoder 20 and/or video decoder 30 may further identify a temporal reference video block 212 (CurrTRefX) in a temporal reference picture 270 in the same view ($V_m$) as the current video block 250 (Curr). Video encoder 20 and/or video decoder 30 identify temporal reference video block 212 using TMV 210 of the current video block 250. Video encoder 20 and/or video decoder 30 may determine TMV 210 using any of the techniques described herein. Video encoder 20 and/or video decoder 30 may further identify a temporal reference video block 216 (BaseTRefX) in a temporal reference picture 272 in the reference view, i.e., the same view as inter-view reference video block 206 (BaseX). Video encoder 20 and/or video decoder 30 may identify temporal reference video block 216 in the reference view using TMV 210 of current video block 250 (Curr). A vector 220 of TMV 210+DV 204 may identify temporal reference video block 216 (BaseTRefX) relative to current video block 250 (Curr). As can be seen in FIG. 12, for reference picture list X (i.e., a first prediction direction), video encoder 20 and/or video decoder 30 are configured to identify and access three reference blocks (i.e., reference blocks 206, 212, and 216).

Video encoder 20 and/or video decoder 30 may be configured to identify and access reference blocks for reference picture list Y (i.e., a first prediction direction) in a similar manner as described above with reference to FIG. 11. Video encoder 20 and/or video decoder 30 identify an inter-view reference video block 256 (BaseY) in an inter-view reference picture 258 of a reference/base view ($V_0$ in FIG. 12). Video encoder 20 and/or video decoder 30 identify inter-view reference video block 256 based on DMV 254 of current video block 250 (Curr).

Video encoder 20 and/or video decoder 30 may further identify a temporal reference video block 273 (CurrTRefY) in a temporal reference picture 268 in the same view ($V_m$) as the current video block 250 (Curr). Video encoder 20 and/or video decoder 30 may identify temporal reference video block 273 using TMV' 285 of the current video block 250. The video coder uses a TMV' 285 and associated reference picture, e.g., a temporal reference picture 265 in the reference view ($V_0$), of inter-view reference video block 256 together with DMV 254 to identify a temporal reference video block 271 (BaseTRefY) in temporal reference picture 265 in the reference view ($V_0$). The identification of temporal reference video block 271 (BaseTRefY) based on TMV' 285 and DMV 254 is represented by the dashed vector (TMV'+DMV). Temporal reference video block 271 (BaseTRefY) in the reference view ($V_0$) and temporal reference video block 273 (CurrTRefY) in the current view ($V_m$) may be within the same access unit, i.e., temporal reference picture 265 in the reference view ($V_0$) and temporal reference picture 268 in the current view ($V_m$) may be in the same access unit.

As can be seen in FIG. 12, for reference picture list Y (i.e., a second prediction direction), video encoder 20 and/or video decoder 30 are configured to identify and access an additional three reference blocks (i.e., reference blocks 256, 271, and 273).

The aforementioned techniques for ARP in 3D-HEVC exhibit several drawbacks. As one example, the number of memory accesses to motion information is increased when performing block-level ARP or PU-level ARP in conjunction with bi-directional prediction, as bi-directional prediction inherently includes the use of motion information for two different reference picture lists. In addition, the number of reference blocks that are identified and accesses is high. Thus, bi-directional prediction in combination with ARP increases decoder complexity.

This disclosure proposes various example techniques to address the above-mentioned problem for ARP in order to reduce video decoder complexity. Each of the techniques listed below decreases the number of memory accesses needed to perform ARP and other associated video coding techniques relative to current proposals for ARP.

Figure 13:
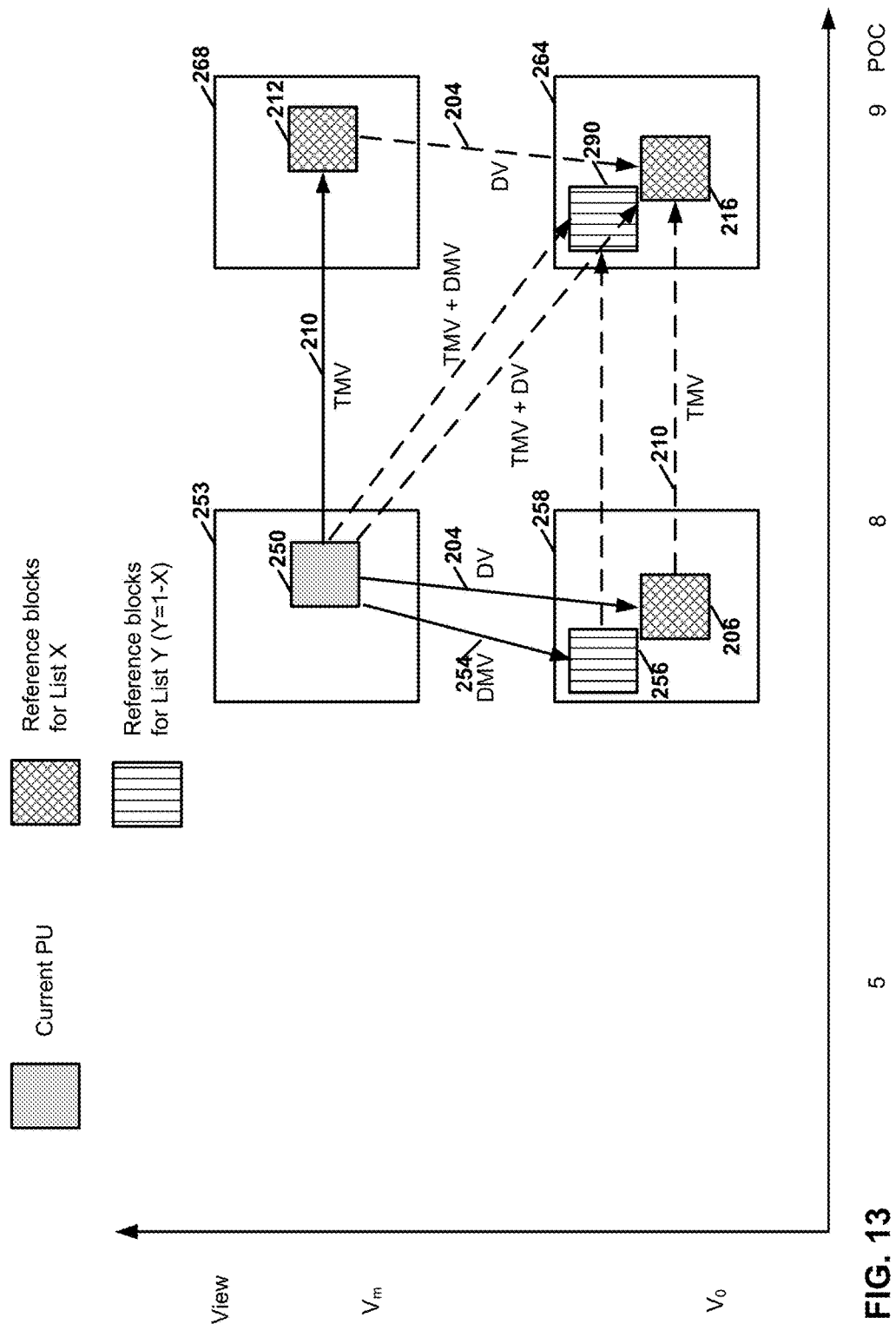
FIG. 13 is a conceptual diagram illustrating an example prediction structure for bi-directional ARP using inter-view prediction for one reference picture list and temporal prediction for another reference picture list according to the techniques of this disclosure.

FIG. 13 is a conceptual diagram illustrating an example prediction structure for bi-directional ARP using inter-view prediction for one reference picture list and temporal prediction for another reference picture list according to the techniques of this disclosure. In the example of FIG. 13, video encoder 20 and/or video decoder 30 are configured to code current video block 250 using bi-directional prediction and ARP. The bi-directional prediction includes temporal prediction for reference picture list X (e.g., a first prediction direction) and inter-view prediction for reference picture list Y (e.g., a second prediction direction).

According to the techniques of FIG. 13, video encoder 20 and/or video decoder 30 are configured to identify reference block 206 (BaseX), reference block 216 (BaseTrefX), and reference block 212 (CurrTrefX) for reference picture list X (e.g., a first prediction direction) in the same manner as described above with reference to FIG. 12. That is TMV 210 is used to identify reference block 216 (BaseTrefX) and reference block 212 (CurrTrefX) relative to reference block 206 (BaseX) and current video block 250, respectively. In addition, video encoder 20 and/or video decoder 30 are configured to identify reference block 256 (BaseY) for reference picture list Y (e.g., a second prediction direction) using DMV 254 (i.e., in the same manner as described above with reference to FIG. 12).

However, video encoder 20 and/or video decoder 30 do not use temporal motion information associated with reference block 256 (BaseY) to identify CurrTrefY and BaseTrefY. Instead, in accordance with the techniques of this disclosure, video encoder 20 and/or video decoder 30 may be configured to use the temporal motion information for reference list X (i.e., TMV 210) to identify CurrTrefY and BaseTrefY. As shown in FIG. 13, video encoder 20 and/or video decoder 30 are configured to identify reference block 290 (BaseTrefY) in view $V_0$ using TMV 210 relative to reference block 256 (BaseY). That is, video encoder 20 and/or video decoder 30 are configured to identify reference block 290 (BaseTrefY) using both DMV 254 and TMV 210. Video encoder 20 and/or video decoder 30 are further configured to identify CurrTrefY in the same view (Vm) as current video block 250 using TMV 210. As such, reference block 212 serves as both CurrTrefX and CurrTrefY. Thus, using the techniques of this disclosure, video encoder 20 and/or video decoder 30 only identify and access 5 reference blocks, instead of 6, when performing ARP with bi-directional prediction.

In summary, identifying reference blocks for inter-view ARP corresponding to reference picture list Y (e.g., a second prediction direction), video encoder 20 and video decoder 30 may use the temporal motion information (e.g., TMV 210 in FIG. 13) associated with temporal prediction for reference picture list X to identify the reference blocks in a different access unit (i.e., reference blocks 290 and 212). In this case, when performing the inter-view ARP, the reference block in a different access unit than the current view (i.e., reference block 212) does not need to be generated, since it is the same as the reference block identified for temporal ARP for reference picture list X. That is, reference block 212 is used for both temporal ARP and inter-view ARP.

In this way, temporal motion information for a first prediction direction is reused for a second prediction direction. As such, fewer memory accesses of temporal motion information need to be made since the temporal motion information of the block identified by the motion vector of the first encoded block corresponding to the second prediction direction is not needed to be accessed, thus allowing for quicker video decoding. In addition, the total number of reference blocks used when performing ARP may be reduced from 6 to 5, which results in less computational complexity in terms of interpolation using multiplication and addition operations. Likewise, when performing bi-directional inter-prediction, video encoder 20 may be configured to reuse temporal motion information for a first prediction direction when encoding the second prediction direction.

In another example of the disclosure, video encoder 20 and video decoder 30 may configured to perform a simplified ARP process when one prediction direction (e.g., corresponding to reference picture list X) of the bi-direction prediction corresponds to a temporal reference picture and the other prediction direction (e.g., corresponding to reference picture list Y) corresponds to an inter-view reference picture. In this case, for temporal ARP corresponding to reference picture list X, video encoder 20 and video decoder 30 may be configured to use the disparity motion vector (MVY) associated with the inter-view reference picture to identify the reference blocks in the reference view (e.g., reference block 273 in FIG. 12) instead of using a disparity vector derived from an NBDV/DoNBDV derivation process. Meanwhile, the disparity vector from NBDV or DoN-BDV process is kept changed, which may be still used in inter-view motion prediction to generate the IPMVC or IDMVC.

It should be noted that the above methods may be applied to both the PU-level ARP or block-level ARP. PU-level and block-level ARP will be described in more detail below.

Techniques for block-level ARP will now be discussed. Different from the above description, wherein all blocks within one PU share the same motion information for ARP (sometimes called PU-level ARP), in block-level ARP, one PU is split into several sub-blocks (e.g., 8×8 sub-blocks) and each sub-block is associated with its own derived motion information to perform ARP. That is, each sub-block shares the same motion information as the current PU. However, the derived motion vector (i.e., a disparity vector in temporal ARP or a temporal motion vector in inter-view ARP) may be determined for each sub-block.

Figure 14:
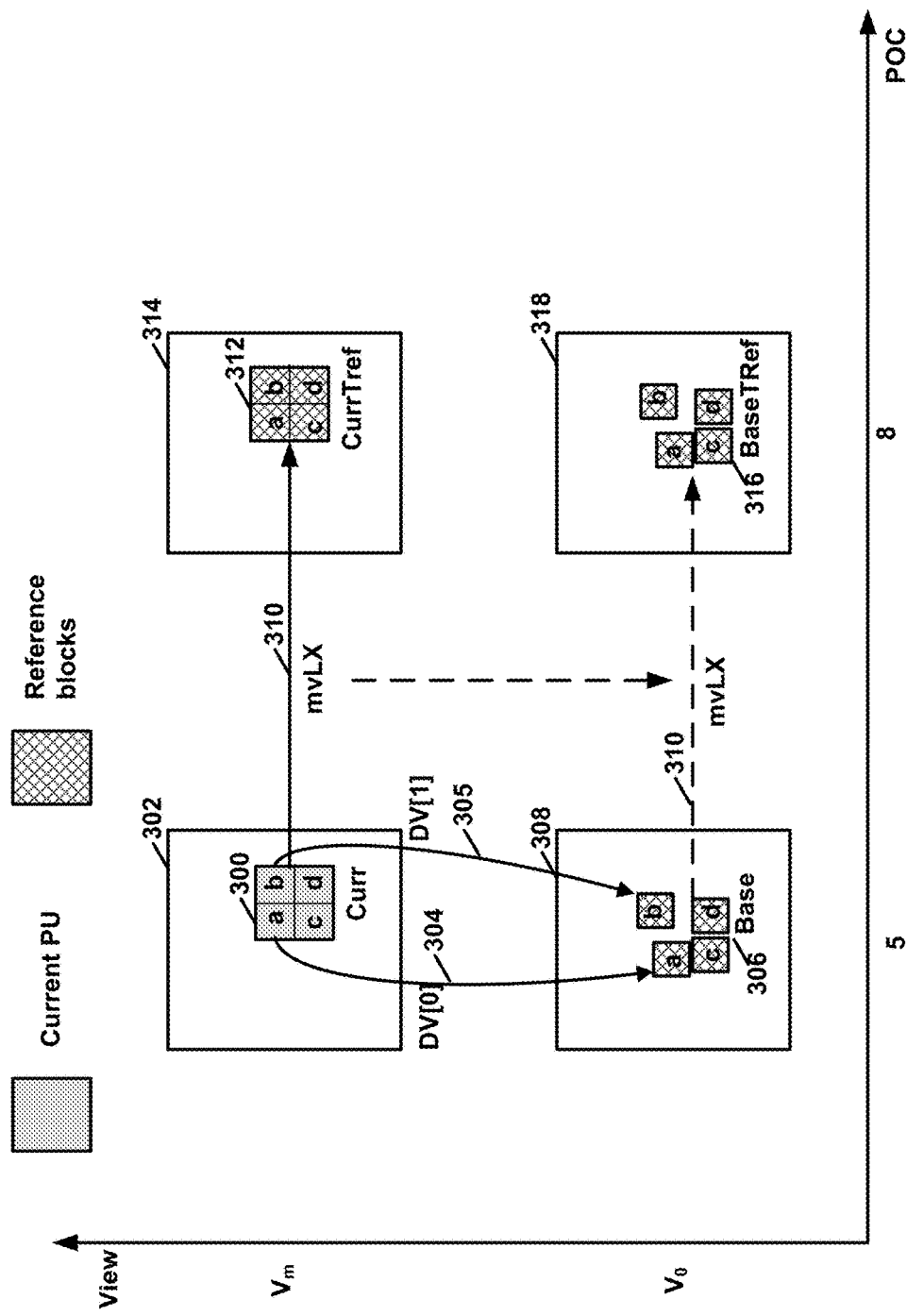
FIG. 14 is a conceptual diagram illustrating block-based temporal ARP.

FIG. 14 is a conceptual diagram illustrating block-based temporal ARP. As shown in FIG. 14, current picture 302 includes a current block 300 (Curr) divided into four sub-blocks 300a, 300b, 300c, and 300d. Motion vector 310 (mvLX) is the motion vector used to perform inter-prediction on current block 300. Motion vector 310 points to a reference block 312 (CurrTref), which includes sub-blocks 312a-d, in reference picture 314. Current picture 302 and reference picture 314 are in the same view (Vm).

For block-based temporal ARP, a default derived motion vector is used for each of sub-blocks 300a-d. For temporal ARP, the default derived motion vector is a disparity vector denoted by DV[i] for the i-th sub-block in FIG. 14, and may be derived using an NBDV derivation process, as in current ARP. That is, an NBDV derivation process may be performed for each of sub-blocks 300a-d to derive a DV for each of sub-blocks 300a-d. Each of the derived DVs points to a particular reference block 306a-d (Base) in reference view 308. For example, DV 304 (DV[0]) points to reference block 306a and DV 305 (DV[1]) points to reference block 306b.

Reference view 308 is at the same time instance as current picture 302, but is in another view. When the center position of one of sub-blocks 312a-d within reference block 312 contains a disparity motion vector, the disparity vector DV[i] for the corresponding one of current sub-block 300a-d is updated to use that disparity motion vector. That is, for example, if the center position of reference sub-block 312a, corresponding to current sub-block 300a, has an associated disparity motion vector, the disparity motion vector associated with reference sub-block 312a is used as the disparity vector for sub-block 300a.

Once each of the reference blocks 306a-d has been identified, motion vector 310 may be used to find reference blocks 316a-d (BaseTRef) in reference picture 318. Reference picture 318 is in a different time instance, as well as different view, than current picture 302. Residual predictors may then be determined by subtracting reference blocks 306a-d (Base) from corresponding reference blocks 316a-d (BaseTref). ARP may then be performed for each of sub-blocks 300a-d.

Figure 15:
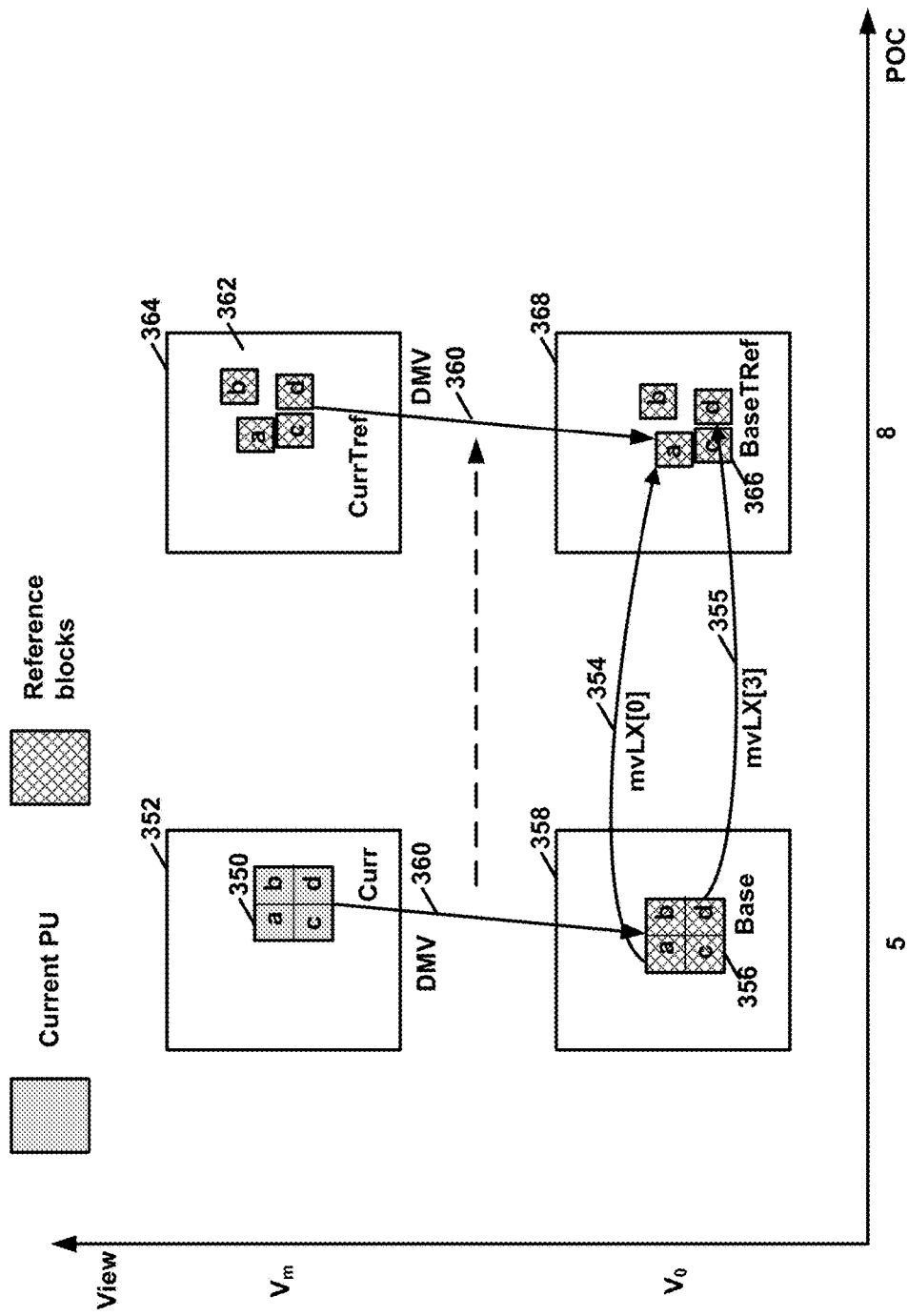
FIG. 15 is a conceptual diagram illustrating block-based inter-view ARP.

FIG. 15 is a conceptual diagram illustrating block-based inter-view ARP. As shown in FIG. 15, current picture 352 includes a current block 350 (Curr) divided into four sub-blocks 350, 350b, 350c, and 350d. Disparity motion vector 360 (DMV) is the disparity motion vector used to perform inter-view prediction on current block 350. Disparity motion vector 360 points to a reference block 356 (Base), which includes sub-blocks 356a-d, in reference picture 358. Current picture 352 and reference picture 358 are in the same time instance, but in different views.

For block-based inter-view ARP, a default derived motion vector is used for each of sub-blocks 350a-d. For inter-view ARP, the default derived motion vector is a motion vector denoted by mvLX[i] for the i-th sub-block in FIG. 15, and may be set as the temporal motion vector covering the center position of each of sub-blocks 356a-d, as in current ARP. That is, the block covering the center position of the i-th 8×8 block within sub-blocks 356 contains a temporal motion vector, mvLX[i] is updated to be that temporal motion vector.

Each of the derived motion vectors points to a particular reference block 366a-d (BaseTref) in reference view 368. For example, motion vector 354 (mvLX[0]) points to reference block 368a and motion vector 355 (mvLX[3]) points to reference block 366d.

Once each of the reference blocks 366a-d has been identified, disparity motion vector 360 may be used to find reference blocks 362a-d (CurrTRef) in reference picture 364. Reference picture 364 is in a different time instance than current picture 352. Residual predictors may then be determined by subtracting reference blocks 362a-d (CurrTref) from corresponding reference blocks 366a-d (BaseTref). ARP may then be performed for each of sub-blocks 350a-d.

As described above, for block-based temporal ARP, motion vector 310 is accessed and used to locate reference block 312 (CurrTref). Likewise, for block-based inter-view ARP, disparity motion vector 360 is accessed and used to locate reference block 356 (Base).

Figure 16:
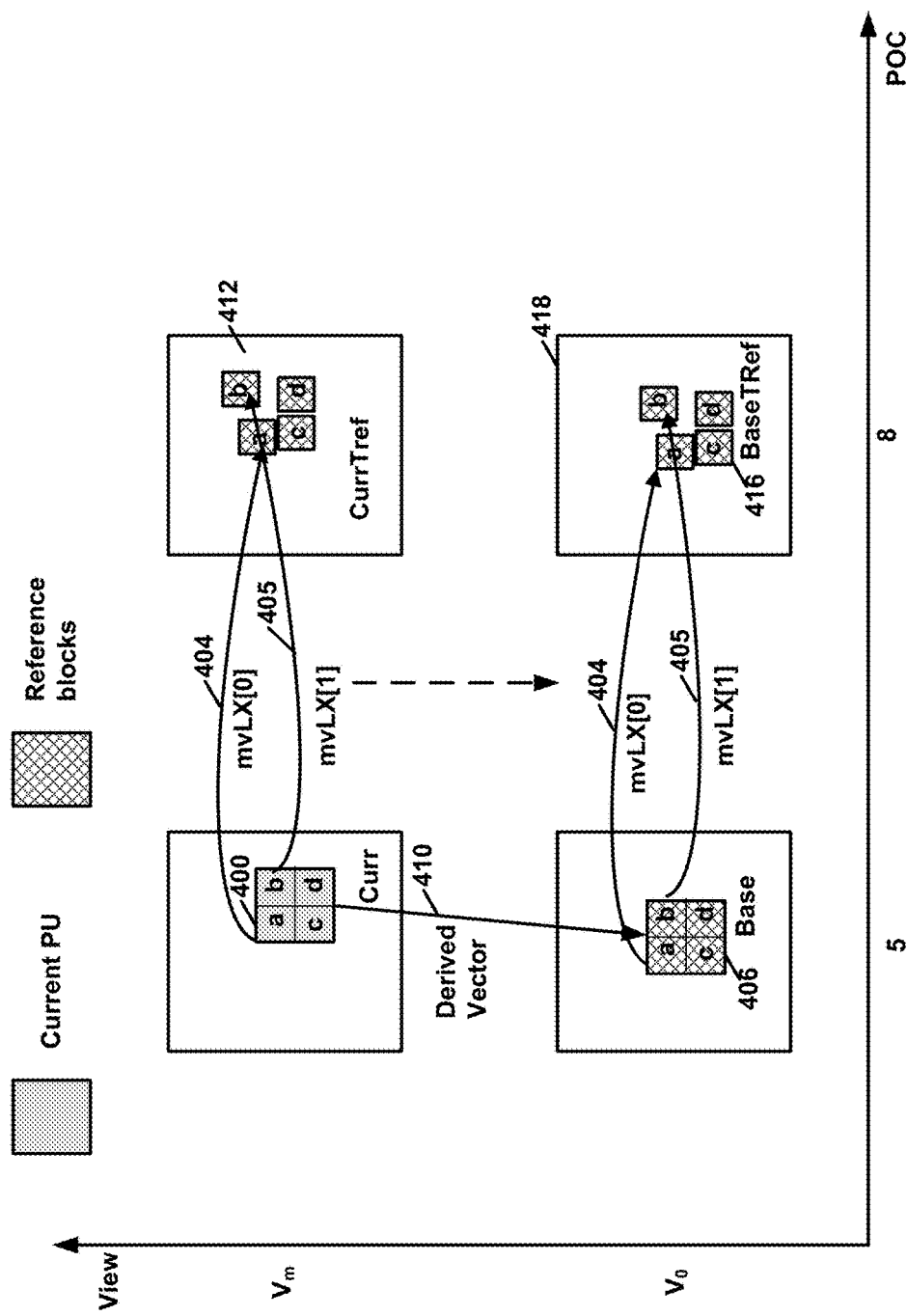
FIG. 16 is a conceptual diagram illustrating block-based ARP with a sub-PU merging candidate.

FIG. 16 is a conceptual diagram illustrating block-based ARP with a sub-PU merging candidate. When sub-PU inter-view motion prediction is enabled, the motion information of one reference block (406) identified by derived disparity vector 410 from a NBDV/DoNBDV derivation process is accessed to derive the sub-PU merging candidate. After the sub-PU merging candidate is determined, i.e., for each sub-PU within block 400 (Curr), it will have its temporal motion information, as denoted by motion vector 404 (mvLX[0]) and motion vector 405 (mvLX[1]) as shown in FIG. 14. Motion vectors 404 and 405 may be used to identify reference blocks 412 (CurrTref) and reference blocks 416 (BaseTref).

When an ARP process is invoked, the motion information of each sub-block (e.g., 8×8 block) within reference block 412 (CurrTRef) is also accessed. When the corresponding sub-block 412a-d (CurrRef) is associated with a disparity motion vector, the disparity motion vector may be used to locate a reference block in a reference view (e.g., block 406).

Therefore, the motion information of two blocks may be needed to be accessed. That is, motion information for one block identified by a DV from an NBDV/DoNBDV process is accessed for the sub-PU inter-view merge candidate. In addition, motion information is access for a block identified by any derived temporal motion information.

The aforementioned techniques for ARP in 3D-HEVC exhibit several drawbacks. As one example, when both the sub-PU inter-view merge prediction and block-level temporal ARP are used for coding one PU, the motion information of two reference blocks is accessed. One is a reference block in a reference view which is identified by a disparity vector derived from a DoNBDV/NBDV derivation process. In addition, corresponding motion information is accessed to derive the sub-PU inter-view merge candidate. After the sub-PU inter-view merge candidate is derived, another block in a temporal reference picture is accessed to check whether the block in the temporal reference picture contains a disparity motion vector. The double access of motion information associated with different blocks increases the complexity significantly of video decoder design significantly, and may decrease decoder throughput.

As another drawback, when sub-PU (i.e., block-level) ARP is used, the disparity motion vectors associated with the reference block pointed to by a current block's temporal motion vector are used to update the default disparity vector. For one sub-block block, even if the sub-block has the same disparity motion vector as its neighboring blocks (either left, above, below or right), the ARP process is still performed at each sub-block, thus increasing video decoder complexity.

This disclosure proposes various example techniques to address the above-mentioned problem for ARP in order to reduce video decoder complexity. Each of the techniques listed below decreases the number of memory accesses needed to perform ARP and other associated video coding techniques relative to current proposals for ARP.

In one example of the disclosure, when sub-PU inter-view motion prediction is enabled, and a sub-PU inter-view merge candidate (which corresponds to temporal motion information) is applied to current PU, video encoder 20 and video decoder 30 may be configured to disable block-level ARP. Instead, PU-level ARP may be enabled.

When the sub-PU inter-view motion prediction is enabled, and PU-level ARP is applied, video encoder 20 and video decoder 30 may determine temporal motion information for each sub-PU. That is, each sub-PU has its own temporal motion information. However, video encoder 20 and video decoder 30 determine the same disparity vector for all sub-PUs. The temporal motion information and disparity vector are used to derive the residual and residual predictor, as described above. Note that when sub-PU inter-view motion prediction applies, the ARP process used is temporal ARP.

The following example techniques are used when sub-PU inter-view motion prediction is not used. In one example, for the temporal ARP, video encoder 20 and video decoder 30 may determine a disparity vector for each sub-PU. In one example, the determined disparity vector may be disparity motion information derived from the reference block of the current sub-PU identified by the current sub-PU's temporal motion information in the temporal reference picture. For inter-view ARP, video encoder 20 and video decoder 30 may determine temporal motion information for each sub-PU. In one example, the temporal motion information may be derived from the reference block of current sub-PU identified by the current sub-PU's disparity motion information in the inter-view reference picture.

In another example of the disclosure, when sub-PU inter-view motion prediction is enabled, video encoder 20 and video decoder may be configured to disable block-level ARP for one prediction direction corresponding to a particular reference picture list if the associated reference picture is a temporal reference picture. In this case, video encoder 20 and video decoder 30 may be configured to only enable PU-level ARP for this prediction direction.

In one example, the following process is applied. If current PU uses an inter-view merge candidate, video encoder 20 and video decoder 30 determine temporal motion information for each sub-PU. However, video encoder 20 and video decoder 30 determine the same disparity vector for all sub-PUs. The temporal motion information and disparity vector are used to derive the residual and residual predictor, as described above.

Otherwise, if the current PU uses one of the other available merge candidates (i.e., not an inter-view merge candidate), video encoder 20 and video decoder 30 apply PU-level temporal ARP, wherein all blocks within the current PU share the same motion information, for one prediction direction if the corresponding reference picture is a temporal reference picture. For the one prediction direction, if the corresponding reference picture is an inter-view reference picture, video encoder 20 and video decoder 30 use PU-level inter-view ARP, wherein all blocks within the current PU share the same motion information. In this case, block-level ARP may also be applied wherein the blocks within the current PU may share the same disparity motion information and different temporal motion information.

In another example of the disclosure, when block-level ARP is enabled, video encoder 20 and video decoder 30 may determine the block size for performing ARP based on the motion information. In one example, for one prediction direction corresponding to a particular reference picture list, if the corresponding reference picture is a temporal reference picture, video encoder 20 and video decoder 30 may use block-level ARP. In this case, a current block has the same disparity motion information as its neighboring block (e.g., left, above, below and/or right neighboring blocks). Furthermore, the current block and the neighboring blocks are merged together and ARP is performed once for the merged blocks.

In another example of the disclosure, for one prediction direction corresponding to a reference picture list, video encoder 20 and video decoder 30 may use block-level ARP if the corresponding reference picture is an inter-view reference picture. In this case, a current block has the same temporal motion information as its neighboring blocks (e.g., left, above, below and/or right neighboring blocks. Furthermore, the current block and the neighboring blocks are merged together and ARP is performed once for the merged blocks.

Figure 17:
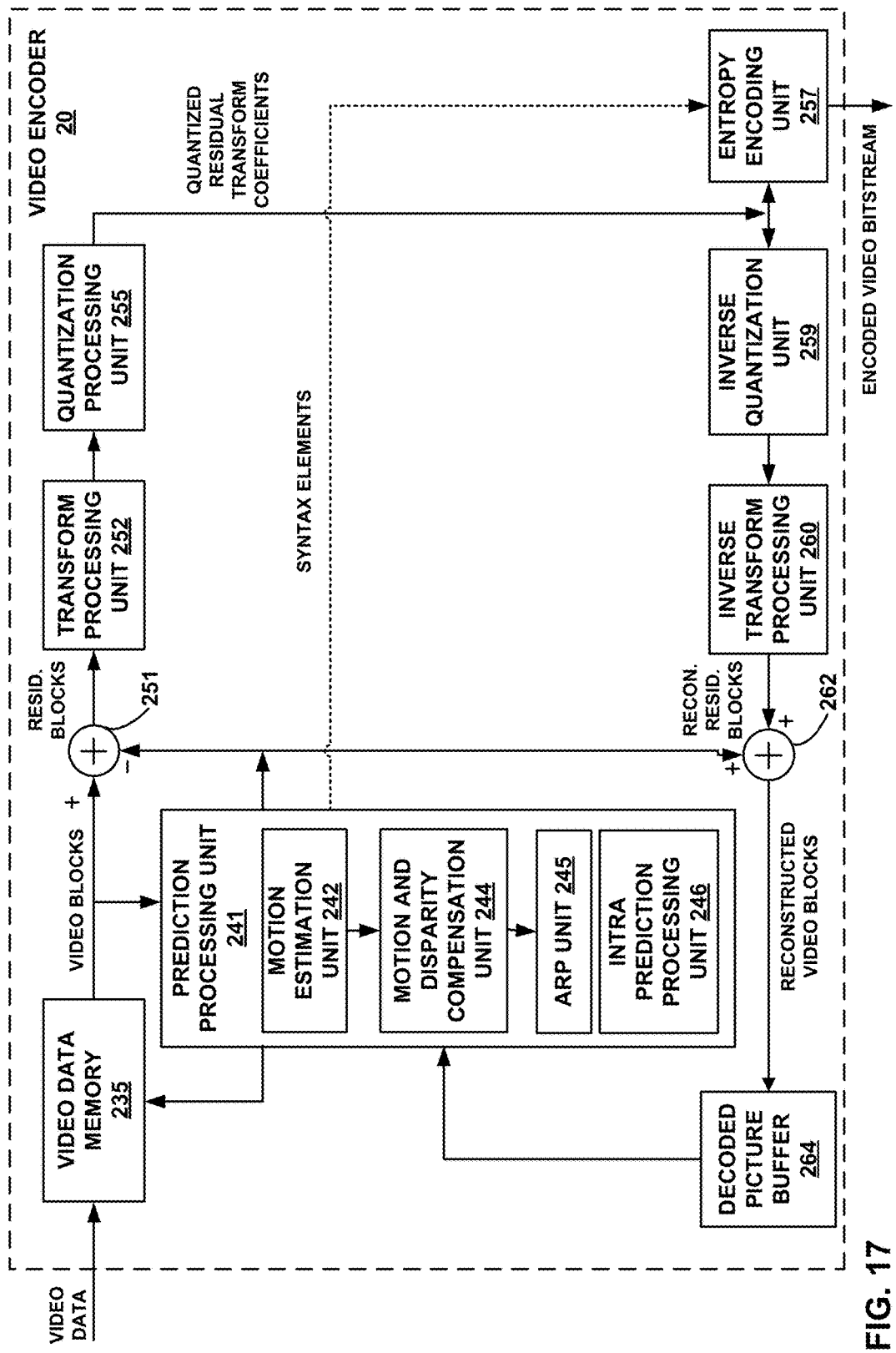
FIG. 17 is a block diagram illustrating an example video encoder that may implement the techniques described in this disclosure.

FIG. 17 is a block diagram illustrating an example video encoder 20 that may be configured to perform the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes.

In the example of FIG. 17, video encoder 20 includes video data memory 235, prediction processing unit 241, decoded picture buffer (DPB) 264, summer 251, transform processing unit 252, quantization processing unit 255, and entropy encoding unit 257. Prediction processing unit 241 includes motion estimation unit 242, motion and disparity compensation unit 244, advanced residual prediction (ARP) unit 245, and intra-prediction processing unit 246. For video block reconstruction, video encoder 20 also includes inverse quantization processing unit 259, inverse transform processing unit 260, and summer 262. A deblocking filter (not shown in FIG. 17) may also be included to filter block boundaries to remove blockiness artifacts from reconstructed video. If desired, the deblocking filter would typically filter the output of summer 262. Additional loop filters (in loop or post loop) may also be used in addition to the deblocking filter.

In various examples, one or more hardware units of video encoder 20 may be configured to perform the techniques of this disclosure. For example, motion and disparity compensation unit 244 and ARP unit 245 may perform the techniques of this disclosure, alone, or in combination with other units of video encoder 20.

As shown in FIG. 17, video encoder 20 receives video data (e.g., a block of video data, such as a luminance block, a chrominance block, or a depth block) within a video frame (e.g., a texture image or a depth map) to be encoded. Video data memory 235 may store video data to be encoded by the components of video encoder 20. The video data stored in video data memory 40 may be obtained, for example, from video source 18. DPB 264 is a memory buffer that stores reference video data for use in encoding video data by video encoder 20 (e.g., in intra or inter coding modes, also referred to as intra or inter prediction coding modes). Video data memory 235 and DPB 264 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 235 and DPB 264 may be provided by the same memory device or separate memory devices. In various examples, video data memory 235 may be on-chip with other components of video encoder 20, or off-chip relative to those components.

As shown in FIG. 17, video encoder 20 receives video data and partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 241 may select one of a plurality of possible coding modes, such as one of a plurality of intra coding modes or one of a plurality of inter coding modes, for the current video block based on error results (e.g., coding rate and the level of distortion). Prediction processing unit 241 may provide the resulting intra- or inter-coded block to summer 251 to generate residual block data and to summer 262 to reconstruct the encoded block for use as a reference picture.

Intra-prediction processing unit 246 within prediction processing unit 241 may perform intra-predictive coding of the current video block relative to one or more neighboring blocks in the same frame or slice as the current block to be coded to provide spatial compression. Motion estimation unit 242 and motion and disparity compensation unit 244 within prediction processing unit 241 perform inter-predictive coding (including inter-view coding) of the current video block relative to one or more predictive blocks in one or more reference pictures (including inter-view reference pictures), e.g., to provide temporal and/or inter-view compression.

Motion estimation unit 242 may be configured to determine the inter-prediction mode for a video slice according to a predetermined pattern for a video sequence. Motion estimation unit 242 and motion and disparity compensation unit 244 may be highly integrated, but are illustrated separately for conceptual purposes. Motion estimation, performed by motion estimation unit 242, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 264. For example, video encoder 20 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

Motion estimation unit 242 calculates a motion vector and/or disparity motion vector for a PU of a video block in an inter-coded slice by comparing the position of the PU to the position of a predictive block of a reference picture (including a temporal or an inter-view reference picture). As described above, a motion vector may be used for motion-compensated prediction, while a disparity motion vector may be used for disparity-compensated prediction. The reference picture may be selected from a first reference picture list (List 0 or RefPicList0) or a second reference picture list (List 1 or RefPicList1), each of which identify one or more reference pictures stored in DPB 264. Motion estimation unit 242 sends the calculated motion vector to entropy encoding unit 257 and motion and disparity compensation unit 244.

Motion and/or disparity compensation, performed by motion and disparity compensation unit 244, may involve fetching or generating the predictive block based on the motion vector determined by motion estimation, possibly performing interpolations to sub-pixel precision. Upon receiving the motion vector for the PU of the current video block, motion and disparity compensation unit 244 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 251 represents the component or components that perform this subtraction operation. Motion and disparity compensation unit 244 may also generate syntax elements associated with the video blocks and the video slice for use by video decoder 30 in decoding the video blocks of the video slice.

Video encoder 20, including ARP unit 245 and motion and disparity compensation unit 244, may perform any of the bi-directional prediction and ARP techniques, e.g., inter-view or temporal ARP techniques described herein. In particular, in one example of the disclosure, video encoder may be configured to encode a current block of video data using bi-directional prediction and inter-view ARP. For the current block of video data, motion and disparity compensation unit 244 may be configured to determine temporal motion information for a first prediction direction (e.g., reference picture list X) for the current block of video data, and identify reference blocks for a second prediction direction (e.g., reference picture list Y) using the temporal motion information determined for the first prediction direction, wherein the reference blocks for the second prediction direction are in a different access unit the current block of video data. In this way, fewer memory accesses of motion information and reference blocks are needed to encode the current video block.

Intra-prediction processing unit 246 may perform intra-prediction on a current block, as an alternative to the inter-prediction performed by motion estimation unit 242 and motion and disparity compensation unit 244, as described above. In particular, intra-prediction processing unit 246 may determine an intra-prediction mode to use to encode a current block. In some examples, intra-prediction processing unit 246 may encode a current video block using various intra-prediction modes, e.g., during separate encoding passes, and intra-prediction processing unit 246 (or prediction processing unit 241, in some examples) may select an appropriate intra-prediction mode to use from the tested modes.

For example, intra-prediction processing unit 246 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 246 may calculate ratios from the distortions and rates for the various encoded blocks to determine which intra-prediction mode exhibits the best rate-distortion value for the block.

In any case, after selecting an intra-prediction mode for a block, intra-prediction processing unit 246 may provide information indicative of the selected intra-prediction mode for the block to entropy encoding unit 257. Entropy encoding unit 257 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 241 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 252. Transform processing unit 252 transforms the residual video data into residual transform coefficients using a transform, such as a discrete cosine transform (DCT) or a conceptually similar transform. Transform processing unit 252 may convert the residual video data from a pixel domain to a transform domain, such as a frequency domain.

Transform processing unit 252 may send the resulting transform coefficients to quantization processing unit 255. Quantization processing unit 255 quantizes the transform coefficients to further reduce bit rate. The quantization process may reduce the bit depth associated with some or all of the coefficients. The degree of quantization may be modified by adjusting a quantization parameter. In some examples, quantization processing unit 255 may then perform a scan of the matrix including the quantized transform coefficients. Alternatively, entropy encoding unit 257 may perform the scan.

Following quantization, entropy encoding unit 257 entropy encodes the quantized transform coefficients. For example, entropy encoding unit 257 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 257, the encoded video bitstream may be transmitted to video decoder 30, or archived for later transmission or retrieval by video decoder 30. Entropy encoding unit 257 may also entropy encode the motion vectors and the other syntax elements for the current video slice being coded.

Inverse quantization processing unit 259 and inverse transform processing unit 260 apply inverse quantization and inverse transformation, respectively, to reconstruct the residual block in the pixel domain for later use as a reference block of a reference picture. Motion and disparity compensation unit 244 may calculate a reference block by adding the residual block to a predictive block of one of the reference pictures within one of the reference picture lists. Motion and disparity compensation unit 244 may also apply one or more interpolation filters to the reconstructed residual block to calculate sub-integer pixel values for use in motion estimation. Summer 262 adds the reconstructed residual block to the motion compensated prediction block produced by motion and disparity compensation unit 244 to produce a reference block for storage in DPB 264. The reference block may be used by motion estimation unit 242 and motion and disparity compensation unit 244 as a reference block to inter-predict a block in a subsequent video frame or picture.

Figure 18:
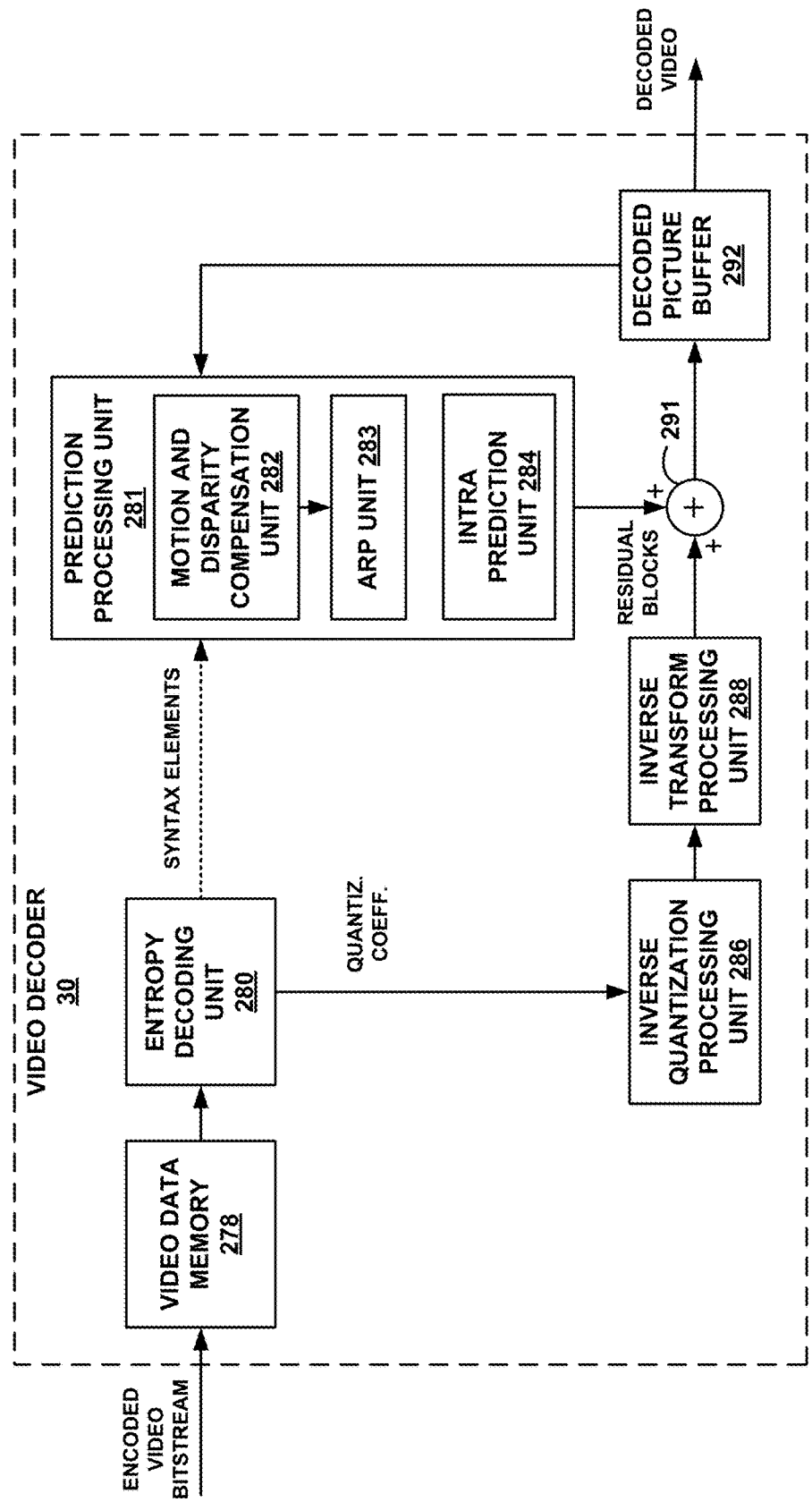
FIG. 18 is a block diagram illustrating an example video decoder that may utilize the techniques described in this disclosure.

FIG. 18 is a block diagram illustrating an example video decoder 30 that may implement the techniques described in this disclosure. In the example of FIG. 18, video decoder 30 includes video data memory 278, entropy decoding unit 280, prediction processing unit 281, inverse quantization processing unit 286, inverse transformation processing unit 288, summer 291, and decoded picture buffer (DPB) 292. Prediction processing unit 281 includes motion and disparity compensation unit 282, ARP unit 283, and intra-prediction processing unit 284. Video decoder 30 may, in some examples, perform a decoding pass generally reciprocal to the encoding pass described with respect to video encoder 20 from FIG. 17.

In various examples, one or more hardware units of video decoder 30 may be tasked to perform the techniques of this disclosure. For example, ARP unit 283 and motion and disparity compensation unit 282 may perform the techniques of this disclosure, alone, or in combination with other units of video encoder.

Video data memory 278 may store video data, such as an encoded video bitstream, to be decoded by the components of video decoder 30. The video data stored in video data memory 278 may be obtained from a local video source, such as a camera, via wired or wireless network communication of video data, or by accessing physical data storage media. Video data memory 278 may form a coded picture buffer (CPB) that stores encoded video data from an encoded video bitstream. DPB 292 is one example of a DPB that stores reference video data for use in decoding video data by video decoder 30 (e.g., in intra or inter coding modes, also referred to as intra or inter prediction coding modes). Video data memory 278 and DPB 292 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 278 and DPB 292 may be provided by the same memory device or separate memory devices. In various examples, video data memory 278 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 280 of video decoder 30 entropy decodes the bitstream to generate quantized coefficients, motion vectors, and other syntax elements. Entropy decoding unit 280 forwards the motion vectors and other syntax elements to prediction processing unit 281. Video decoder 30 may receive the syntax elements at the video slice level and/or the video block level.

When the video slice is coded as an intra-coded (I) slice, intra-prediction processing unit 284 of prediction processing unit 281 may generate prediction data for a video block of the current video slice based on a signaled intra prediction mode and data from previously decoded blocks of the current frame or picture. When the video frame is coded as an inter-coded (i.e., B or P) slice or inter-view coded slice, motion and disparity compensation unit 282 of prediction processing unit 281 produces predictive blocks for a video block of the current video slice based on the motion vectors, disparity motion vectors, and other syntax elements received from entropy decoding unit 280. The predictive blocks may be produced from one of the reference pictures within one of the reference picture lists including inter-view reference pictures. Video decoder 30 may construct the reference frame lists, RefPicList0 and RefPicList1, using default construction techniques or any other technique based on reference pictures stored in DPB 292.

Motion and disparity compensation unit 282 determines prediction information for a video block of the current video slice by parsing the motion vectors and other syntax elements, and uses the prediction information to produce the predictive blocks for the current video block being decoded. For example, motion and disparity compensation unit 282 uses some of the received syntax elements to determine a prediction mode (e.g., intra- or inter-prediction) used to code the video blocks of the video slice, an inter-prediction slice type (e.g., B slice, P slice, and/r inter-view predicted slice), construction information for one or more of the reference picture lists for the slice, motion vectors and/or disparity motion vectors for each inter-encoded video block of the slice, inter-prediction status for each inter-coded video block of the slice, and other information to decode the video blocks in the current video slice.

Motion and disparity compensation unit 282 may also perform interpolation based on interpolation filters. Motion and disparity compensation unit 282 may use interpolation filters as used by video encoder 20 during encoding of the video blocks to calculate interpolated values for sub-integer pixels of reference blocks. In this case, motion and disparity compensation unit 282 may determine the interpolation filters used by video encoder 20 from the received syntax elements and use the interpolation filters to produce predictive blocks.

Inverse quantization processing unit 286 inverse quantizes, i.e., dequantizes, the quantized transform coefficients provided in the bitstream and decoded by entropy decoding unit 280. The inverse quantization process may include use of a quantization parameter calculated by video encoder 20 for each video block in the video slice to determine a degree of quantization and, likewise, a degree of inverse quantization that should be applied. Inverse transform processing unit 288 applies an inverse transform, e.g., an inverse DCT, an inverse integer transform, or a conceptually similar inverse transform process, to the transform coefficients in order to produce residual blocks in the pixel domain.

Video decoder 30, including ARP unit 283 and motion and disparity compensation unit 282, may perform any of the bi-directional prediction and/or ARP techniques, e.g., inter-view or temporal ARP techniques described herein. In particular, in one example of the disclosure, video decoder 30 may be received a current block of video data encoded using bi-directional prediction and inter-view ARP. The encoded block of video data may be stored in video data memory 278. For the encoded block of video data, motion and disparity compensation unit 282 may be configured to determine temporal motion information for a first prediction direction (e.g., reference picture list for the encoded block of video data, and identify reference blocks for a second prediction direction (e.g., reference picture list Y) using the temporal motion information determined for the first prediction direction, wherein the reference blocks for the second prediction direction are in a different access unit the current block of video data. In this way, fewer memory accesses of motion information and reference blocks are needed to decode the encoded video block.

After motion and disparity compensation unit 282 generates the predictive block for the current video block based on the motion vectors and other syntax elements, video decoder 30 forms a decoded video block by summing the residual blocks from inverse transform processing unit 288 with the corresponding predictive blocks generated by motion and disparity compensation unit 282. Summer 291 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 292, which stores reference pictures used for subsequent motion compensation. DPB 292 also stores decoded video for later presentation on a display device, such as display device 32 of FIG. 1.

Figure 19:
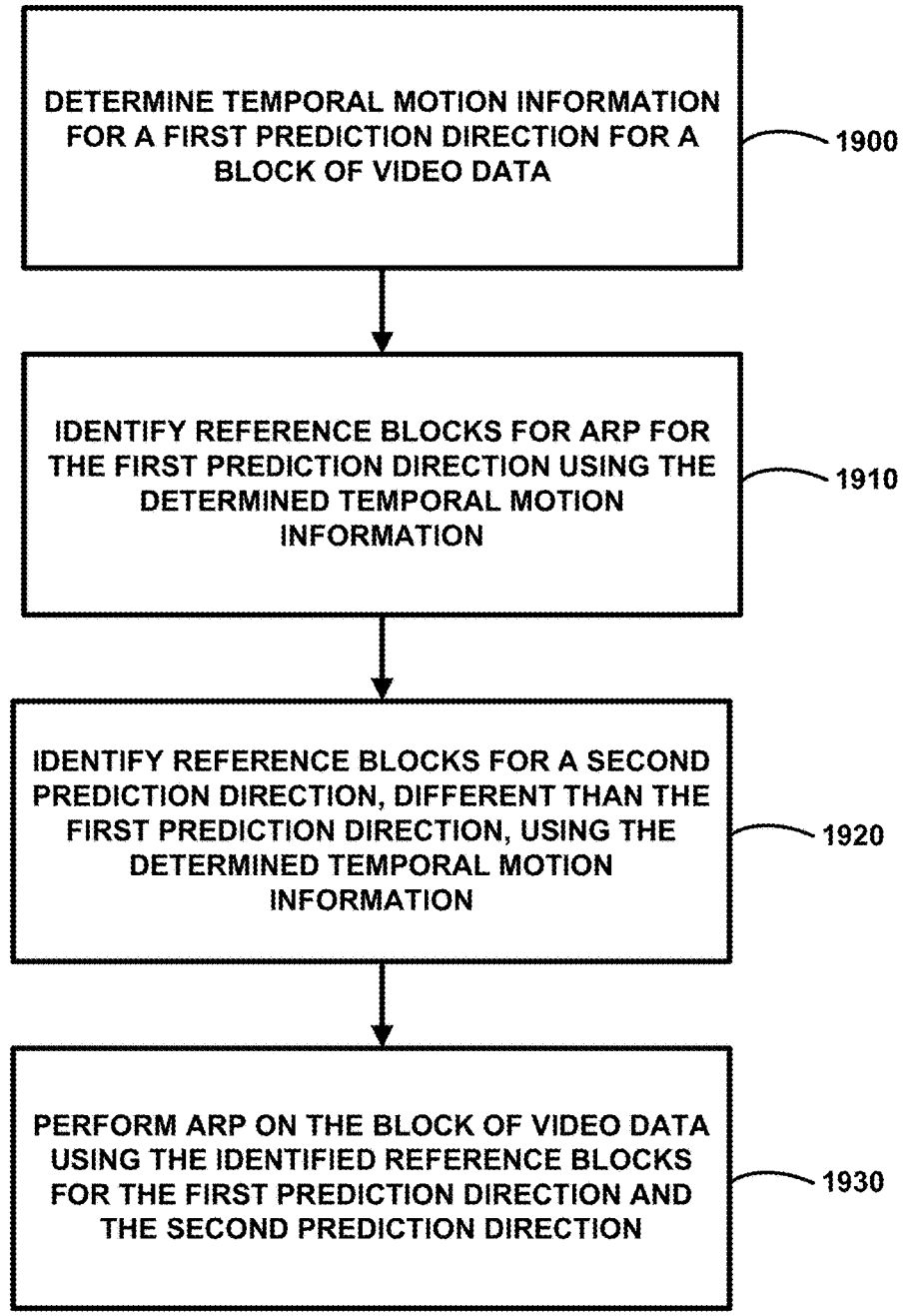
FIG. 19 is a flow diagram illustrating an example ARP method for encoding a video block according to the techniques described in this disclosure.

FIG. 19 is a flow diagram illustrating an example ARP method for encoding a video block according to the techniques described in this disclosure. The techniques of FIG. 19 may be performed by any combination of hardware structures of video encoder 20, including motion and disparity compensation unit 244 and ARP unit 245.

In one example of the disclosure, video encoder 20 may be configured to encode a block of video data using ARP and bi-directional prediction. In this example, the bi-directional prediction includes temporal prediction for a first prediction direction (e.g., for reference picture list X) and inter-view prediction for a second prediction direction (e.g., for reference picture list Y). Motion and disparity compensation unit 244 may be configured to determine temporal motion information for the first prediction direction for the block of video data (1900). ARP unit 245 may be configured to identify reference blocks for the first prediction direction using the determined temporal motion information (1910) and identify reference blocks for the second prediction direction, different than the first prediction direction, using the determined temporal motion information for the first prediction direction (1920). The reference blocks may be in an access unit different than the access unit for the block of video data. ARP unit 245 may be further configured to perform advanced residual prediction on the block of video data using the identified reference blocks for the first prediction direction and the second prediction direction (1930).

In other examples of the disclosure, motion and disparity compensation unit 244 may be configured to determine disparity motion information for the second prediction direction for the first encoded block of video data. In addition, ARP unit 245 may be configured to identify a first reference block for the first prediction direction using the determined temporal motion information, wherein the first reference block is in a second access unit of the first view. ARP unit 245 may be further configured to identify a second reference block for the second prediction direction using the determined temporal motion information, and to identify a third reference block for the second prediction direction using the determined temporal motion information and the determined disparity motion information, wherein the third reference block is in a third access unit of a second view.

Figure 20:
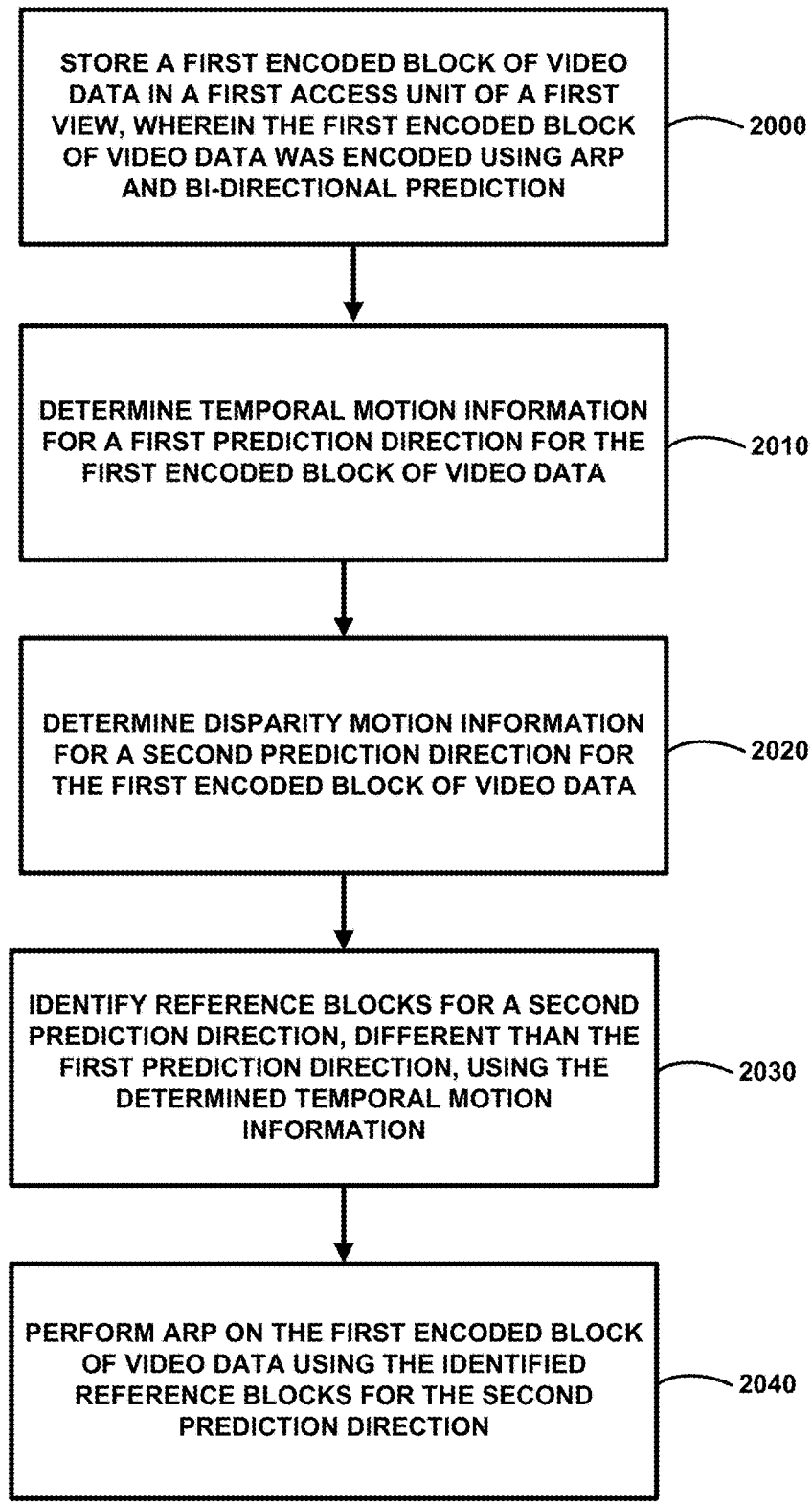
FIG. 20 is a flow diagram illustrating an example ARP method for decoding a video block according to the techniques described in this disclosure.

FIG. 20 is a flow diagram illustrating an example ARP method for decoding a video block according to the techniques described in this disclosure. The techniques of FIG. 20 may be performed by any combination of hardware structures of video decoder, ARP unit 283 and motion and disparity compensation unit 282.

In one example of the disclosure, video decoder 30 may be configured to store a first encoded block of video data in a first access unit of a first view, wherein the first encoded block of video data was encoded using advanced residual prediction and bi-directional prediction (2000). The bi-directional prediction may include temporal prediction for a first prediction direction and inter-view prediction for a second prediction direction.

Motion and disparity compensation unit 282 may be configured to determine temporal motion information for the first prediction direction for the first encoded block of video data (2010). ARP unit 283 may be configured to determine disparity motion information for the second prediction direction for the first encoded block of video data (2020), and identify reference blocks for the second prediction direction, different than the first prediction direction, using the determined temporal motion information for the first prediction direction (2030). The reference blocks may be in an access unit different than the first access unit. ARP unit 283 may be further configured to perform advanced residual prediction on the first encoded block of video data using the identified reference blocks for the second prediction direction (2040).

In another example of the disclosure, ARP unit 238 may be configured to identify reference blocks for the first prediction direction using the determined temporal motion information, and performing advanced residual prediction on the first encoded block of video data using the identified reference blocks for the first prediction direction. ARP unit 283 may be further configured to identify a second reference block for the second prediction direction using the determined temporal motion information, and to identify a third reference block for the second prediction direction using the determined temporal motion information and the determined disparity motion information, wherein the third reference block is in a third access unit of a second view. The first reference block of the first prediction direction is the same as the second reference block of the second prediction direction In another example of the disclosure, video decoder 30 may be configured to decode the first encoded block of video data using the identified reference blocks for the first prediction direction and the identified reference blocks for the second prediction direction.

In another example of the disclosure, video decoder 30 may be configured to decode the first encoded block of video data using one of block-level advanced residual prediction or prediction unit-level advanced residual prediction to produce residual video data, decode the residual data using bi-directional prediction, the identified reference block for the first prediction direction, and the identified reference block for the second prediction direction to produce a decoded block of video data.

In another example of the disclosure, video decoder 30 may be further configured to store a second encoded block of video data in a fourth access unit of a third view, wherein the second encoded block of video data was encoded using advanced residual prediction and bi-directional prediction. The bi-directional prediction may include temporal prediction for a third prediction direction and inter-view prediction for a fourth prediction direction.

Motion and disparity compensation unit 282 may be configured to determine temporal motion information for the first prediction direction for the first encoded block of video data. ARP unit 283 may be configured to identify reference blocks for the first prediction direction using the determined temporal motion information. ARP unit 283 may further identify reference blocks for the second prediction direction, different than the first prediction direction, using the determined temporal motion information for the first prediction direction, wherein the reference blocks are in an access unit different than the first access unit. ARP unit 283 may also perform advanced residual prediction on the first encoded block of video data using the identified reference blocks for the first prediction direction and the second prediction direction.

In another example of the disclosure, motion and disparity compensation unit 282 may be configured to determine disparity motion information for the second prediction direction for the first encoded block of video data. ARP unit 283 may be configured to identify a first reference block for the first prediction direction using the determined temporal motion information, wherein the first reference block is in a second access unit of the first view. ARP unit 283 may be further configured to identify a second reference block for the second prediction direction using the determined temporal motion information and the determined disparity motion information, wherein the second reference block is in a third access unit of a second view.

In another example of the disclosure, video decoder 30 may be configured to decode the first encoded block of video data using the identified reference blocks for the first prediction direction and the identified reference blocks for the second prediction direction. Video decoder 30 may be further configured to decode the first encoded block of video data using one of block-level advanced residual prediction or prediction unit-level advanced residual prediction to produce residual video data, and decode the residual data using bi-directional prediction, the identified reference block for the first prediction direction, and the identified reference block for the second prediction direction to produce a decoded block of video data.

In some examples, one or more aspects of the techniques described in this disclosure may be performed by an intermediate network device such as a media aware network element (MANE), a stream adaptation processor, a splicing processor, or an editing processor. For example, such an intermediate device may be configured to generate or receive any of a variety signaling as described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method for decoding video data, the method comprising:
receiving a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction, and wherein the advanced residual prediction includes performing a prediction of a residual of the first encoded block of video data relative to a residual of a residual predictor block;
determining first temporal motion information for the first prediction direction for the first encoded block of video data;
identifying a first temporal reference block for the first prediction direction using the first temporal motion information for the first prediction direction, wherein the first temporal reference block is in the first view and in a second access unit, the second access unit different than the first access unit;
deriving a disparity vector for the first prediction direction for the first encoded block of video data;
identifying a first inter-view reference block using the disparity vector for the first prediction direction, wherein the first inter-view reference block is in a second view, the second view being different than the first view;
identifying a second inter-view reference block using the first inter-view reference block and the first temporal motion information for the first prediction direction, the second inter-view reference block being in the second view;
determining a first residual predictor block from the first inter-view reference block and the second inter-view reference block;

determining first disparity motion information for the second prediction direction for the first encoded block of video data;

identifying a second temporal reference block for the second prediction direction using the first temporal motion information for the first prediction direction, wherein the second temporal reference block is the same as the first temporal reference block;

identifying a third inter-view reference block using the first disparity motion information for the second prediction direction, wherein the third inter-view reference block is in the second view;

identifying a fourth inter-view reference block using the third inter-view reference block and the first temporal motion information for the first prediction direction, the second inter-view reference block being in the second view;

determining a second residual predictor block from the third inter-view reference block and the fourth inter-view reference block; and performing advanced residual prediction on the first encoded block of video data using the first temporal reference block, the second temporal reference block, the first residual predictor block and the second residual predictor block.

2. The method of claim 1, the method further comprising:

decoding the first encoded block of video data using one of block-level advanced residual prediction or prediction unit-level advanced residual prediction to produce residual video data; and decoding the residual data using bi-directional prediction with the first temporal reference block for the first prediction direction and the second temporal reference block for the second prediction direction to produce a decoded block of video data.

3. An apparatus configured to decode video data, the apparatus comprising:

a video data memory configured to store a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction and wherein the advanced residual prediction includes performing a prediction of a residual of the first encoded block of video data relative to a residual of a residual predictor block; and one or more processors in communication with the video data memory and configured to:

determine first temporal motion information for the first prediction direction for the first encoded block of video data;

identify a first temporal reference block for the first prediction direction using the first temporal motion information for the first prediction direction, wherein the first temporal reference block is in the first view and in a second access unit, the second access unit different than the first access unit;

derive a disparity vector for the first prediction direction for the first encoded block of video data;

identify a first inter-view reference block using the disparity vector for the first prediction direction, wherein the first inter-view reference block is in a second view, the second view being different than the first view;

identify a second inter-view reference block using the first inter-view reference block and the first temporal motion information for the first prediction direction, the second inter-view reference block being in the second view;

determine a first residual predictor block from the first inter-view reference block and the second inter-view reference block;

determine first disparity motion information for the second prediction direction for the first encoded block of video data;

identify a second temporal reference block for the second prediction direction using the first temporal motion information for the first prediction direction, wherein the second temporal reference block is the same as the first temporal reference block;

identify a third inter-view reference block using the first disparity motion information for the second prediction direction, wherein the third inter-view reference block is in the second view;

identify a fourth inter-view reference block using the third inter-view reference block and the first temporal motion information for the first prediction direction, the second inter-view reference block being in the second view;

determine a second residual predictor block from the third inter-view reference block and the fourth inter-view reference block; and perform advanced residual prediction on the first encoded block of video data using the first temporal reference block, the second temporal reference block, the first residual predictor block and the second residual predictor block.

4. The apparatus of claim 3, wherein the one or more processors are further configured to:

decode the first encoded block of video data using one of block-level advanced residual prediction or prediction unit-level advanced residual prediction to produce residual video data; and decode the residual data using bi-directional prediction with the first temporal reference block for the first prediction direction and the second temporal reference block for the second prediction direction to produce a decoded block of video data.

5. The apparatus of claim 4, further comprising:

a display configured to display the decoded block of video data.

6. The apparatus of claim 3, wherein the video data memory and the one or more processors are housed within one of a desktop computer, a notebook computer, a laptop computer, a set-top box, a telephone handset, a smart phone, a smart pad, a tablet computer, a television, a camera, a digital media player, a video gaming console, or a video streaming device.

7. An apparatus configured to decode video data, the apparatus comprising:

means for receiving a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction and wherein the advanced residual prediction includes performing a prediction of a residual of the first encoded block of video data relative to a residual of a residual predictor block;

means for determining first temporal motion information for the first prediction direction for the first encoded block of video data;

means for identifying a first temporal reference block for the first prediction direction using the first temporal motion information for the first prediction direction, wherein the first temporal reference block is in the first view and a second access unit, the second access unit different than the first access unit;

means for deriving a disparity vector for the first prediction direction for the first encoded block of video data;

means for identifying a first inter-view reference block using the disparity vector for the first prediction direction, wherein the first inter-view reference block is in a second view, the second view being different than the first view;

means for identifying a second inter-view reference block using the first inter-view reference block and the first temporal motion information for the first prediction direction, the second inter-view reference block being in the second view;

means for determining a first residual predictor block from the first inter-view reference block and the second inter-view reference block;

means for determining first disparity motion information for the second prediction direction for the first encoded block of video data;

means for identifying a second temporal reference block for the second prediction direction using the first temporal motion information for the first prediction direction, wherein the second temporal reference block is the same as the first temporal reference block;

means for identifying a third inter-view reference block using the first disparity motion information for the second prediction direction, wherein the third inter-view reference block is in the second view;

means for identifying a fourth inter-view reference block using the third inter-view reference block and the first temporal motion information for the first prediction direction, the second inter-view reference block being in the second view;

means for determining a second residual predictor block from the third inter-view reference block and the fourth inter-view reference block; and means for performing advanced residual prediction on the first encoded block of video data using the first temporal reference block, the second temporal reference block, the first residual predictor block and the second residual predictor block.

8. The apparatus of claim 7, wherein the means for decoding the first encoded block of video data comprises:

means for decoding the first encoded block of video data using one of block-level advanced residual prediction or prediction unit-level advanced residual prediction to produce residual video data; and means for decoding the residual data using bi-directional prediction with the first temporal reference block for the first prediction direction and the second temporal reference block for the second prediction direction to produce a decoded block of video data.

9. A non-transitory computer-readable storage medium storing instructions that, when executed, cause one or more processors of a device configured to decode video data to:

receive a first encoded block of video data in a first access unit of a first view, wherein the first encoded block of video data was encoded using advanced residual prediction and bi-directional prediction, the bi-directional prediction including temporal prediction for a first prediction direction and inter-view prediction for a second prediction direction and wherein the advanced residual prediction includes performing a prediction of a residual of the first encoded block of video data relative to a residual of a residual predictor block;

determine first temporal motion information for the first prediction direction for the first encoded block of video data;

identify a first temporal reference block for the first prediction direction using the first temporal motion information for the first prediction direction, wherein the first temporal reference block is in the first view and in a second access unit, the second access unit different than the first access unit;

derive a disparity vector for the first prediction direction for the first encoded block of video data;

identify a first inter-view reference block using the disparity vector for the first prediction direction, wherein the first inter-view reference block is in a second view, the second view being different than the first view;

identify a second inter-view reference block using the first inter-view reference block and the first temporal motion information for the first prediction direction, the second inter-view reference block being in the second view;

determine a first residual predictor block from the first inter-view reference block and the second inter-view reference block;

determine first disparity motion information for the second prediction direction for the first encoded block of video data;

identify a second temporal reference block for the second prediction direction using the first temporal motion information for the first prediction direction, wherein the second temporal reference block is the same as the first temporal reference block;

identify a third inter-view reference block using the first disparity motion information for the second prediction direction, wherein the third inter-view reference block is in the second view;

identify a fourth inter-view reference block using the third inter-view reference block and the first temporal motion information for the first prediction direction, the second inter-view reference block being in the second view;

determine a second residual predictor block from the third inter-view reference block and the fourth inter-view reference block; and perform advanced residual prediction on the first encoded block of video data using the first temporal reference block, the second temporal reference block, the first residual predictor block and the second residual predictor block.

10. The non-transitory computer-readable storage medium of claim 9, wherein the instructions further cause the one or more processors to:

decode the first encoded block of video data using one of block-level advanced residual prediction or prediction unit-level advanced residual prediction to produce residual video data; and decode the residual data using bi-directional prediction with the first temporal reference block for the first prediction direction and the second temporal reference block for the second prediction direction to produce a decoded block of video data.

11. The method of claim 1, further comprising:
scaling the first temporal motion information based on a picture order count value.

12. The method of claim 1, further comprising:
receiving a second encoded block of video data in a third access unit of a third view, wherein the second encoded block of video data was encoded using advanced residual prediction and bi-directional prediction, the bi-directional prediction including inter-view prediction for a third prediction direction and temporal prediction for a fourth prediction direction;
determining second disparity motion information for the third prediction direction for the second encoded block of video data;
identifying a fifth inter-view reference block for the third prediction direction using the second disparity motion information for the third prediction direction, wherein the fifth inter-view reference block is in a fourth view, the fourth view different than the third view;
deriving a motion vector from the fifth inter-view reference block for the third prediction direction for the second encoded block of video data;
identifying a third temporal reference block using the motion vector for the third prediction direction;
identifying a sixth inter-view reference block using the fifth inter-view reference block and the motion vector for the first prediction direction;
determining a third residual predictor block from the fifth inter-view reference block and the sixth inter-view reference block;
determining second temporal motion information for the fourth prediction direction for the second encoded block of video data;
identifying a fourth temporal reference block for the fourth prediction direction using the second temporal motion information for the fourth prediction direction;
identifying a seventh inter-view reference block using the second disparity motion information for the third prediction direction, wherein the seventh inter-view reference block is the same as the fifth inter-view reference block;
identifying an eighth inter-view reference block using the seventh inter-view reference block and the second temporal motion information for the fourth prediction direction;
determining a fourth residual predictor block from the seventh inter-view reference block and the eighth inter-view reference block; and
performing advanced residual prediction on the second encoded block of video data using the third temporal reference block, the fourth temporal reference block, the third residual predictor block and the fourth residual predictor block.

13. The apparatus of claim 3, wherein the one or more processors are further configured to:
scale the first temporal motion information based on a picture order count value.

14. The apparatus of claim 3, wherein the one or more processors are further configured to:
receive a second encoded block of video data in a third access unit of a third view, wherein the second encoded block of video data was encoded using advanced residual prediction and bi-directional prediction, the bi-directional prediction including inter-view prediction for a third prediction direction and temporal prediction for a fourth prediction direction;
determine second disparity motion information for the third prediction direction for the second encoded block of video data;
identify a fifth inter-view reference block for the third prediction direction using the second disparity motion information for the third prediction direction, wherein the fifth inter-view reference block is in a fourth view, the fourth view different than the third view;
derive a motion vector from the fifth inter-view reference block for the third prediction direction for the second encoded block of video data;
identify a third temporal reference block using the motion vector for the third prediction direction;
identify a sixth inter-view reference block using the fifth inter-view reference block and the motion vector for the first prediction direction;
determine a third residual predictor block from the fifth inter-view reference block and the sixth inter-view reference block;
determine second temporal motion information for the fourth prediction direction for the second encoded block of video data;
identify a fourth temporal reference block for the fourth prediction direction using the second temporal motion information for the fourth prediction direction;
identify a seventh inter-view reference block using the second disparity motion information for the third prediction direction, wherein the seventh inter-view reference block is the same as the fifth inter-view reference block;
identify an eighth inter-view reference block using the seventh inter-view reference block and the second temporal motion information for the fourth prediction direction;
determine a fourth residual predictor block from the seventh inter-view reference block and the eighth inter-view reference block; and
perform advanced residual prediction on the second encoded block of video data using the third temporal reference block, the fourth temporal reference block, the third residual predictor block and the fourth residual predictor block.

* * * * *